(12) United States Patent
Greco et al.

(10) Patent No.: US 7,662,284 B2
(45) Date of Patent: Feb. 16, 2010

(54) LIQUID FILTER ARRANGEMENT AND METHODS

(75) Inventors: Enrico Greco, Villa Poma (IT); Fabrizio Buratto, Sustinente (IT); Mauro Cantoni, Mantova (IT); Christian Guernieri, Revere (IT); John F. Connelly, Chanhassen, MN (US); John R. Hacker, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 158 days.

(21) Appl. No.: 11/630,705

(22) PCT Filed: Jun. 16, 2005

(86) PCT No.: PCT/US2005/021273

§ 371 (c)(1),
(2), (4) Date: Aug. 9, 2007

(87) PCT Pub. No.: WO2006/012031

PCT Pub. Date: Feb. 2, 2006

(65) Prior Publication Data

US 2008/0142426 A1    Jun. 19, 2008

Related U.S. Application Data

(60) Provisional application No. 60/659,592, filed on Mar. 7, 2005, provisional application No. 60/609,602, filed on Sep. 13, 2004, provisional application No. 60/583,873, filed on Jun. 29, 2004.

(51) Int. Cl.
*B01D 35/147* (2006.01)
*B01D 35/153* (2006.01)

(52) U.S. Cl. .................. 210/234; 210/235; 210/450; 210/136

(58) Field of Classification Search ............... 210/136, 210/234, 235, 450, 767
See application file for complete search history.

(56) References Cited

U.S. PATENT DOCUMENTS

| 3,319,791 | A | * | 5/1967 | Horne ................... 210/234 |
| 3,473,664 | A | | 10/1969 | Hultgren |
| 3,529,722 | A | | 9/1970 | Humbert |
| 3,557,767 | A | | 1/1971 | Green |
| 3,557,958 | A | | 1/1971 | Baldwin |
| 3,618,775 | A | | 11/1971 | Hultgren |
| 3,628,662 | A | | 12/1971 | Eteitarst |
| 3,633,750 | A | | 1/1972 | Braun et al |
| 3,640,390 | A | | 2/1972 | Goy et al. |

(Continued)

FOREIGN PATENT DOCUMENTS

EP    0 322 828    7/1989

(Continued)

*Primary Examiner*—Thomas M Lithgow
(74) *Attorney, Agent, or Firm*—Merchant & Gould P.C.

(57) ABSTRACT

A liquid filter arrangement is provided, as well as methods of assembly and use. The liquid filter arrangement includes an anti-drain back valve assembly therein. Advantageous features, relating to a preferred filter cartridge and preferred anti-drain back valve arrangement, are provided.

25 Claims, 24 Drawing Sheets

U.S. PATENT DOCUMENTS

| | | | |
|---|---|---|---|
| 3,669,144 A | 6/1972 | Palmai | |
| 3,695,437 A | 10/1972 | Shaltis | |
| 3,722,683 A | 3/1973 | Shaltis et al. | |
| 3,726,403 A | 4/1973 | Shaltis | |
| 3,774,764 A | 11/1973 | Baldwin | |
| 3,785,491 A | 1/1974 | Dudinec et al. | |
| 3,822,787 A | 7/1974 | Shaltis et al. | |
| 3,837,495 A | 9/1974 | Baldwin | |
| 3,855,128 A | 12/1974 | Shaltz et al. | |
| 3,941,958 A | 3/1976 | Flesburg | |
| 3,975,273 A | 8/1976 | Shaltz et al. | |
| 3,984,318 A | 10/1976 | Bumb | |
| 3,985,657 A | 10/1976 | Coughlan | |
| 3,996,137 A | 12/1976 | Cooper | |
| 4,035,306 A | 7/1977 | Maddocks | |
| 4,075,098 A | 2/1978 | Paul et al. | |
| 4,114,169 A | 9/1978 | Yamamori | |
| 4,126,559 A | 11/1978 | Cooper | |
| 4,127,484 A | 11/1978 | Walulik et al. | |
| 4,144,168 A | 3/1979 | Thornton | |
| 4,228,012 A | 10/1980 | Pall | |
| 4,237,015 A | 12/1980 | Fearnhead | |
| 4,316,801 A | 2/1982 | Cooper | |
| 4,324,660 A | 4/1982 | Peyton | |
| 4,400,864 A | 8/1983 | Peyton et al. | |
| 4,465,595 A | 8/1984 | Cooper | |
| 4,581,135 A | 4/1986 | Gerulis | |
| 4,668,393 A | 5/1987 | Stone | |
| 4,692,245 A | 9/1987 | Church et al. | |
| 4,740,299 A | 4/1988 | Popoff | |
| 4,820,409 A | 4/1989 | Lowsky et al. | |
| 4,853,118 A | 8/1989 | Brownell | |
| 4,865,738 A | 9/1989 | Black, Jr. et al. | |
| 4,935,127 A | 6/1990 | Lowsky et al. | |
| 4,992,166 A | 2/1991 | Lowsky et al. | |
| 4,997,556 A | 3/1991 | Yano et al. | |
| 5,030,345 A | 7/1991 | Thomas | |
| 5,037,539 A | 8/1991 | Hutchins et al. | |
| 5,039,403 A | 8/1991 | Frostick | |
| 5,049,269 A | 9/1991 | Shah | |
| 5,084,162 A | 1/1992 | Conti | |
| 5,098,559 A | 3/1992 | Mack et al. | |
| 5,114,573 A | 5/1992 | Frostick | |
| 5,250,176 A | 10/1993 | Daniel | |
| 5,256,280 A | 10/1993 | Anderly et al. | |
| 5,284,579 A | 2/1994 | Covington | |
| 5,286,381 A | 2/1994 | Buttery et al. | |
| 5,290,445 A | 3/1994 | Buttery | |
| 5,300,223 A | 4/1994 | Wright | |
| 5,301,958 A | 4/1994 | Covington | |
| 5,350,506 A | 9/1994 | Dombek et al. | |
| 5,362,390 A | 11/1994 | Widenhoefer et al. | |
| 5,405,527 A | 4/1995 | Covington | |
| 5,411,659 A | 5/1995 | Nichols | |
| 5,476,585 A | 12/1995 | Mills | |
| 5,526,782 A | 6/1996 | Bedi et al. | |
| 5,587,066 A | 12/1996 | Covington | |
| 5,643,446 A | 7/1997 | Claussen et al. | |
| 5,676,842 A | 10/1997 | Bedi et al. | |
| 5,690,816 A | 11/1997 | Covington | |
| 5,695,168 A * | 12/1997 | Williams | 251/149.4 |
| 5,698,059 A | 12/1997 | Bilski et al. | |
| 5,716,517 A | 2/1998 | Lasky | |
| 5,733,443 A | 3/1998 | Stamey et al. | |
| 5,766,451 A | 6/1998 | Sparling | |
| 5,779,900 A | 7/1998 | Holm et al. | |
| 5,814,215 A | 9/1998 | Bruss et al. | |
| 5,817,232 A | 10/1998 | Roll et al. | |
| 5,833,843 A | 11/1998 | Covington | |
| 5,855,780 A | 1/1999 | Dye et al. | |
| 5,876,600 A | 3/1999 | Matsubara et al. | |
| 5,895,568 A | 4/1999 | Cooper | |
| 5,914,037 A * | 6/1999 | Yen | 210/234 |
| 6,006,924 A | 12/1999 | Sandford | |
| 6,027,640 A | 2/2000 | Covington et al. | |
| 6,053,334 A | 4/2000 | Popoff et al. | |
| 6,080,311 A | 6/2000 | Martin et al. | |
| 6,096,199 A | 8/2000 | Covington | |
| 6,098,752 A | 8/2000 | McCaleb | |
| 6,146,527 A | 11/2000 | Oelschlaegel | |
| 6,171,482 B1 | 1/2001 | Nichols | |
| 6,171,491 B1 | 1/2001 | Popoff et al. | |
| 6,177,003 B1 | 1/2001 | Jainek et al. | |
| 6,235,194 B1 | 5/2001 | Jousset | |
| 6,261,455 B1 | 7/2001 | Brown et al. | |
| 6,284,130 B1 | 9/2001 | Daniel | |
| 6,296,765 B1 | 10/2001 | Brown et al. | |
| 6,458,269 B1 * | 10/2002 | Bassett et al. | 210/119 |
| 6,488,845 B1 | 12/2002 | Neufeld et al. | |
| 6,495,042 B1 | 12/2002 | Knight | |
| 6,506,303 B1 | 1/2003 | Gustafsson et al. | |
| 6,554,139 B1 | 4/2003 | Maxwell et al. | |
| 6,685,829 B1 | 2/2004 | Baumann et al. | |
| 6,752,924 B2 | 6/2004 | Gustafson et al. | |
| 6,782,917 B2 | 8/2004 | Wolford et al. | |
| 6,790,356 B2 | 9/2004 | Wright et al. | |
| 6,793,808 B2 | 9/2004 | McKenzie | |
| 6,797,168 B1 | 9/2004 | Savage | |
| 6,814,243 B2 | 11/2004 | Amstutz et al. | |
| 6,837,993 B2 | 1/2005 | Clausen et al. | |
| 6,858,134 B2 | 2/2005 | Savage | |
| 6,902,669 B2 | 6/2005 | Jiang | |
| 6,911,143 B2 | 6/2005 | Savage | |
| 6,936,161 B2 | 8/2005 | Wright et al. | |
| 6,936,162 B1 | 8/2005 | McKenzie | |
| 6,939,464 B1 | 9/2005 | Jiang et al. | |
| 6,949,189 B2 | 9/2005 | Bassett et al. | |
| 6,974,539 B1 | 12/2005 | McKenzie | |
| 6,983,851 B2 | 1/2006 | Maxwell et al. | |
| 6,986,426 B2 | 1/2006 | Clausen et al. | |
| 6,986,805 B2 | 1/2006 | Gieseke et al. | |
| 7,070,692 B2 | 7/2006 | Scott et al. | |
| 7,163,623 B2 | 1/2007 | Knight | |
| 7,204,370 B2 | 4/2007 | Clausen et al. | |
| 7,237,682 B2 | 7/2007 | Reynolds et al. | |
| 7,326,342 B2 | 2/2008 | Richmond et al. | |
| 7,360,658 B2 | 4/2008 | Clausen et al. | |
| 7,390,407 B2 | 6/2008 | Weindorf et al. | |
| 2002/0017494 A1 | 2/2002 | Fritze | |
| 2002/0017497 A1 | 2/2002 | Fritze | |
| 2002/0100720 A1 | 8/2002 | Jainek | |
| 2002/0139731 A1 | 10/2002 | Michels et al. | |
| 2002/0139733 A1 | 10/2002 | Michels et al. | |
| 2003/0127384 A1 | 7/2003 | Kapur | |
| 2004/0238422 A1 | 12/2004 | Launer et al. | |
| 2005/0000876 A1 | 1/2005 | Knight | |
| 2005/0040088 A1 | 2/2005 | Cline | |
| 2005/0040092 A1 | 2/2005 | Eilers et al. | |
| 2005/0072721 A1 | 4/2005 | Knight | |
| 2005/0077220 A1 | 4/2005 | Cline | |
| 2005/0150825 A1 | 7/2005 | Clausen et al. | |
| 2005/0161378 A1 | 7/2005 | Cline | |
| 2005/0178706 A1 | 8/2005 | Bagci et al. | |
| 2005/0242012 A1 | 11/2005 | Cline | |
| 2005/0274666 A1 | 12/2005 | Maxwell et al. | |
| 2006/0000886 A1 | 1/2006 | Clark et al. | |
| 2006/0006124 A1 | 1/2006 | Yates et al. | |
| 2006/0054547 A1 | 3/2006 | Richmond et al. | |
| 2006/0086652 A1 | 4/2006 | Knight et al. | |
| 2006/0186031 A1 | 8/2006 | Fick et al. | |
| 2006/0201865 A1 | 9/2006 | Knight | |
| 2006/0231479 A1 | 10/2006 | Clausen et al. | |
| 2007/0039864 A1 | 2/2007 | Dworatzek et al. | |
| 2007/0095744 A1 | 5/2007 | Lim et al. | |

| | | | | FOREIGN PATENT DOCUMENTS | |
|---|---|---|---|---|---|
| 2007/0267338 A1 | 11/2007 | Menez et al. | | | |
| 2008/0020465 A1 | 1/2008 | Padidam | EP | 1 008 375 | 6/2000 |
| 2008/0053884 A1 | 3/2008 | Marshall et al. | FR | 2 471 803 A | 6/1981 |
| 2008/0053886 A1 | 3/2008 | Marshall et al. | GB | 1 482 485 | 8/1977 |
| 2008/0073262 A1 | 3/2008 | Richmond et al. | GB | 2 056 873 | 8/1979 |
| 2008/0169233 A1 | 7/2008 | Pfitzer et al. | GB | 2 364 256 | 1/2002 |
| 2008/0245719 A1 | 10/2008 | Beard et al. | WO | 01/39859 | 6/2001 |
| 2008/0283463 A1 | 11/2008 | Hawkins | WO | 2005/005014 | 1/2005 |
| 2008/0283464 A1 | 11/2008 | Marshall | WO | 2006/031651 | 3/2006 |
| 2009/0050554 A1 | 2/2009 | Shaam | WO | 2006/091557 | 8/2006 |

* cited by examiner

LIQUID FILTER ARRANGEMENT AND METHODS

This application is a National Stage Application of PCT/US2005/021273, filed Jun. 16, 2005, which is the International Application of Serial Nos. 60/583,873, filed Jun. 29, 2004: 60/609,602, filed Sep. 13, 2004 and 60/659,592 filed Mar. 7, 2005 and which application(s) are incorporated herein by reference. A claim of priority to all, to the extent appropriate is made

CROSS-REFERENCE TO RELATED APPLICATIONS

The present PCT application includes, with edits, portions of: U.S. Provisional Application No. 60/659,592 filed Mar. 7, 2005; U.S. Provisional Application No. 60/609,602 filed Sep. 13, 2004; and U.S. Provisional Application No. 60/583,873 filed Jun. 29, 2004. The complete disclosures of the three identified U.S. Provisional Applications are incorporated herein by reference. Further a claim of priority to each of the three applications is made, to the extent appropriate.

TECHNICAL FIELD

This disclosure relates to filtration of fluids. In particular, this disclosure relates to filter systems, apparatus, and methods for purifying liquids including valve constructions and safety features.

BACKGROUND

Filters have been employed in a variety of applications including hydraulic systems and engine lubrication systems. In these types of systems, the filter is changed periodically. One type of filtration system used includes bowl-cartridge filters. Bowl-cartridge filters typically include a reusable bowl holding a replaceable filter element (cartridge filter). Bowl-cartridge filters are typically mounted onto a filter head, wherein liquid to be cleaned passes through the filter head, into the bowl, through the replaceable filter cartridge, outside of the bowl, and back into the filter head. After a period of use, the bowl-cartridge filter is removed from the filter head, and the replaceable cartridge filter is removed from the reusable bowl. The old cartridge filter is discarded and replaced with a new cartridge filter. The new cartridge filter is operably mounted into the reusable bowl, to provide a

SUMMARY

The present disclosure relates to liquid filter arrangements in which an anti-drain back valve assembly is provided. A variety of alternatives useable to implement various principles in association with an anti-drain back valve assembly are described, and examples are shown. For the arrangements shown, the anti-drain back valve assembly is constructed such that it will only allow liquid flow through the valve head if a filter cartridge is properly positioned within a filter assembly using the filter head.

Preferred components, methods of assembly and use are also provided.

A variety of specific features that will accomplish the desirable results, are shown. These are examples, and a variety of alternatives are possible. It is not necessary for an assembly to utilize all of the advantageous features characterized herein, for that assembly to obtain some advantage according to the present disclosure.

BRIEF DESCRIPTION OF THE DRAWINGS

FIG. 3 portion being broken away to show internal detail.

DETAILED DESCRIPTION

I. General Description of an Anti-Drain Back Arrangement, FIG. 1

Figure 1:
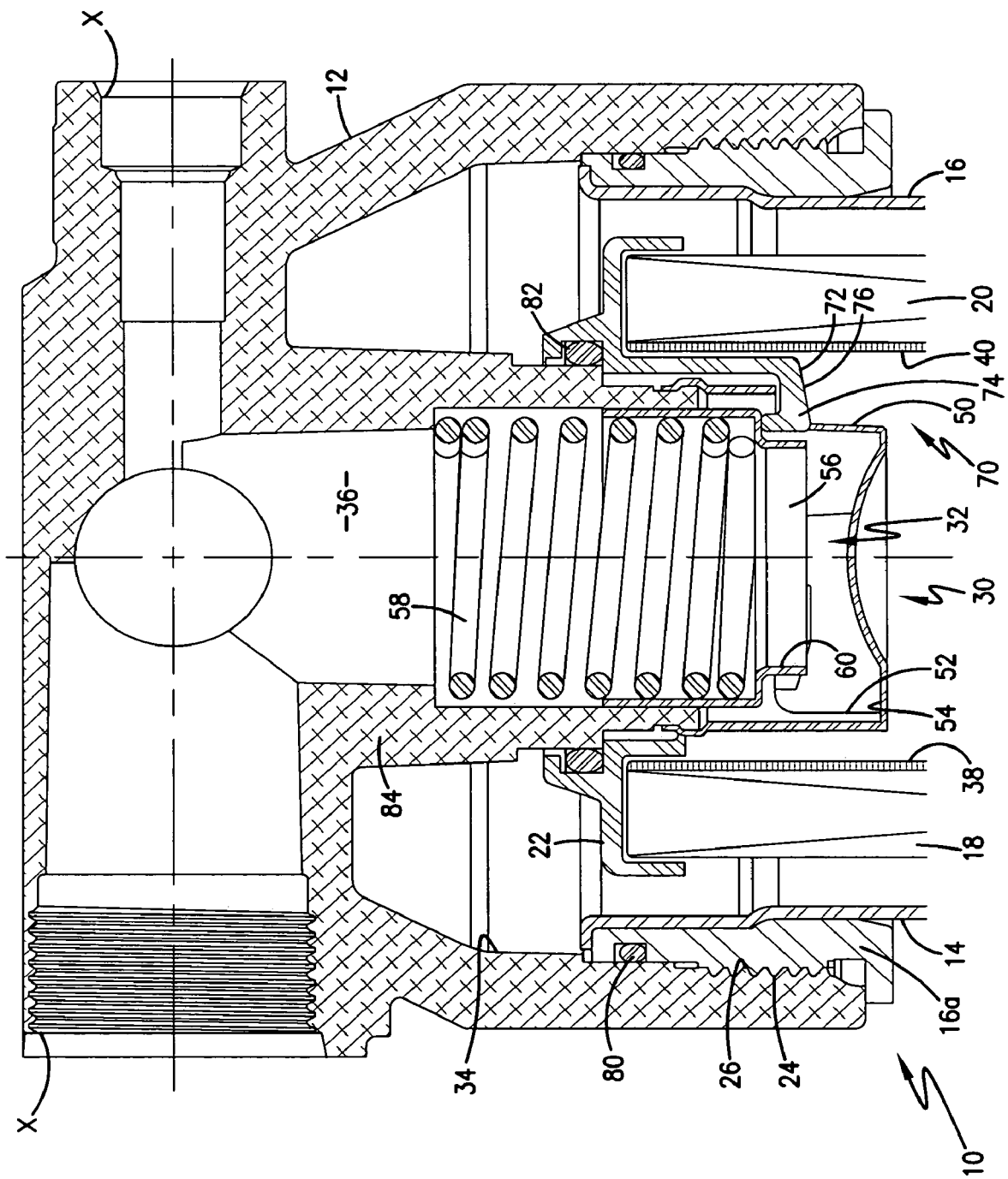
FIG. 1 is a fragmentary, cross-sectional view of a portion of a filter assembly according to the present disclosure.

FIG. 1 depicts a fragmentary, schematic, cross-sectional view of a portion of a filter assembly for purifying fluids, in particular liquids. In FIG. 1, a fragmentary view of a bowl-cartridge filter assembly is shown at 10. The assembly includes a filter head 12 and a bowl-cartridge filter 14. The bowl-cartridge filter 14 includes an outer bowl, can, or housing 16, including a mounting collar 16a, and a removable and replaceable filter cartridge 18. The filter cartridge includes a cylindrical extension of filter media 20. In many typical systems, the filter media 20 extends between opposite end caps, one of which is depicted at 22.

In FIG. 1, it can be seen that the filter housing 16 includes a region of external threads 24. The threaded region 24 engages with threads 26 on the filter head 12. Also viewable in FIG. 1 is a valve construction 30. In the one depicted, the valve construction 30 operates as an anti-drain back valve 32. In typical operation, the anti-drain back valve 32 will be open when the bowl-cartridge filter 14 is operably assembled onto the filter head 12 and fluid is flowing therethrough. The valve 32 will be closed when the bowl-cartridge filter 14 is removed from the filter head 12. This is described further below. In addition, another feature visible in FIG. 1, and discussed further below, is a safety construction 70 that requires a filter to be installed on the filter head 12 in order for the system to operate. In other words, if no filter is installed on the filter head 12, there will be a high restriction or pressure drop, which, with an appropriate sensor system, will cause an alarm, and shut down the system.

In FIG. 1, it can be seen how the filter head 12 defines an unfiltered liquid volume 34, and a filtered liquid volume 36. The unfiltered liquid volume 34 is upstream of the filter media 20, while the filtered liquid volume 36 is downstream of the filter media 20. In operation, liquid to be filtered flows into the filter head 12 through an appropriate one of openings X and into the unfiltered liquid volume 34. From there, the liquid flows through the filter media 20 and into an open filter interior 38. The open filter interior 38 is the volume that is inside or circumscribed by the filter media 20. In some applications, the filter media 20 will have an inner liner or support 40, which is porous to allow the liquid to flow therethrough. From the open filter interior 38, the liquid flows through the valve construction 30 and into the filtered liquid volume 36. From the filtered liquid volume 36, the fluid exits the filter head 12 through a second one of openings X and is used by the system.

The valve apparatus 30 includes a cage 50, the one depicted being cylindrical, defining open slots for example shown at 52. The slots 52 allow fluid flow to pass through the cage 50. The cage 50 contains a valve seat 54. A valve head 56 is held within the cage 50 and is biased in a position against the valve seat 54 by a spring 58. In the position depicted in FIG. 1, the valve head 56 is away from the valve seat 54, to put the valve 30 in an open position. When the valve 30 is in an open position, liquid is allowed to flow from the open filter interior 38 through the slots 52 and through an opening 60 defined by the valve head 56. The fluid flows through the spring 58 and into the filtered liquid volume 36 of the filter head 12.

As mentioned above, the filter assembly 10 includes safety construction at 70. The safety construction 70 ensures that a filter 14 is properly installed on the filter head 12. If a filter 14 is not properly installed on the filter head 12, the valve 30 will remain in a closed position, preventing the flow of fluid (such as oil or lubrication), causing high restriction and a signal or indicator to indicate that there is a problem. In the embodiment shown in FIG. 1, the safety construction 70 includes a protrusion arrangement 72. The protrusion arrangement 72 actuates or engages the valve head 56 to move it away from the valve seat 54, when the filter 14 is operably installed on the filter head 12. In the embodiment shown, the protrusion arrangement 72 includes a plurality of protrusions 74. In the example shown, the protrusions 74 are integral with and preferably molded as a same part of the end cap 22. The protrusions 74 are depicted as hook-shaped members 76 that extend into the open filter interior 38. As such, the hook-shaped members 76 are circumscribed by the filter media 20. In the one shown, the hook-shaped members 76 are adjacent and against the inner liner 40. At least two hook-shaped members 76 are typical, usually there will be 2-4, for example 3 hook-shaped members 76.

Other features that can be seen in FIG. 1 include a seal member 80 between the filter head 12 and the housing 16. There is also a seal member 82 formed between the filter cartridge 18 and the filter head 12. In particular, the seal member 82 is between a portion of the end cap 22 and a central outlet tube 84 of the filter head 12.

In operation, the arrangement of FIG. 1 works as follows: liquid to be filtered flows into the filter head 12 into the unfiltered liquid volume 34. From there, it flows through the filter cartridge 18, including the filter media 20. It then flows into the open filter interior 38 and through the slots 52 in the cage 50. The valve head 56 is biased away from the valve seat 54 because the protrusion arrangement 70 is engaged pushing the valve head 56 away from the seal 54. This allows the liquid to flow through the opening 60, through the spring 58, and into the filtered liquid volume 36. From there, the liquid exits the filter head 12.

After a period of use, the filter media 20 becomes occluded and it is time to change the filter. To service the filter assembly 10, the bowl-cartridge filter 14 is removed from the filter head 12. Once it is removed, the valve head 56 becomes biased against the valve seat 54 because the spring 58 pushes the valve head 56 against the seat 54. The cartridge 18 is removed from the bowl or housing 16 and replaced with a new cartridge 18. While the assembly 14 is removed from the head 12, because the valve 30 is in a closed position, liquid is not allowed to drain back and flow through the valve head 12. If someone tried to operate the system before the filter 14 was replaced on the filter head 12, because the valve 30 is in a closed position, there would be a high restriction causing an alarm or signal to indicate that there was a problem.

Figure 2:
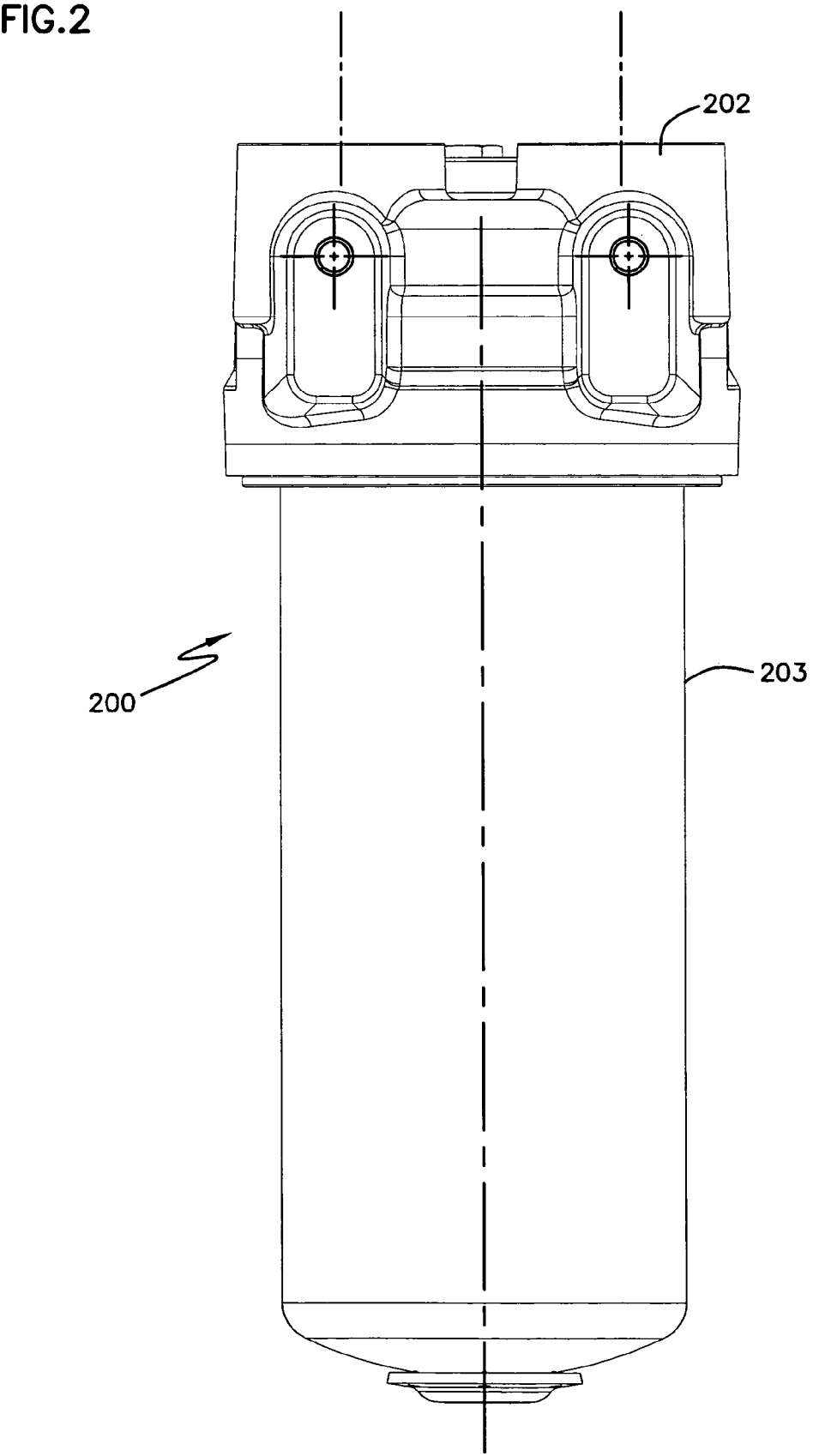
FIG. 2 is a side elevational view of a filter assembly including componentry according to the present disclosure.

The refurbished filter 14 including the new filter cartridge 18 is placed on the filter head 12. While the threaded engagement is made between the bowl 18 and the head 12, the protrusion arrangement 72 engages the filter head 56. This urges the valve head 56 away from the valve seat 54, until the filter 14 is fully, properly installed, as shown in FIG. 2.

Once the filter 14 is fully, properly installed on the filter head 12, the seals at 80 and 82 are in place, and the valve 30 is in an open position to allow liquid to flow therethrough. The anti-drain valve 32 can be constructed of stamped steel. The cartridge bowl 16 and inner liner 40 can be constructed of plastic, such as PA 6 or PA 66 or with glass reinforcement. Alternatively, metal or plastic could be chosen for the various parts.

II. A Liquid Filter Including Locker Arrangements for Anti-Drain Back Valve Arrangements

A. General Features of the Drawings

In the figures, certain of the principles characterized above are illustrated in various embodiments, as follows.

The reference numeral 200, FIG. 2, depicts a filter assembly. The filter assembly 200 includes a filter head arrangement or filter head 202 and a housing or bowl 203. The housing or bowl 203 can be removed from the head, for periodic servicing. Servicing would generally involve removal and replacement of an internally received serviceable filter cartridge.

In general, the filter head 202 may have a variety of configurations. The particular filter head 202 shown in FIG. 2 would include at least one inlet port and at least an outlet port, although variations are possible. The particular configuration of the inlet(s) and outlet(s) on the filter head 202 is a matter of choice for the application involved, and does not specifically concern issues described herein, except to ensure proper, functional, flow into and out of the system.

In operation, the filter assembly 200 would be installed in a liquid circulation system (hydraulic, lube or fuel for example) of equipment such as a vehicle, with liquid flow (to be filtered) into the filter head 202 through an inlet port and filtered liquid flow out of the assembly 200 through an outlet port.

Figure 3:
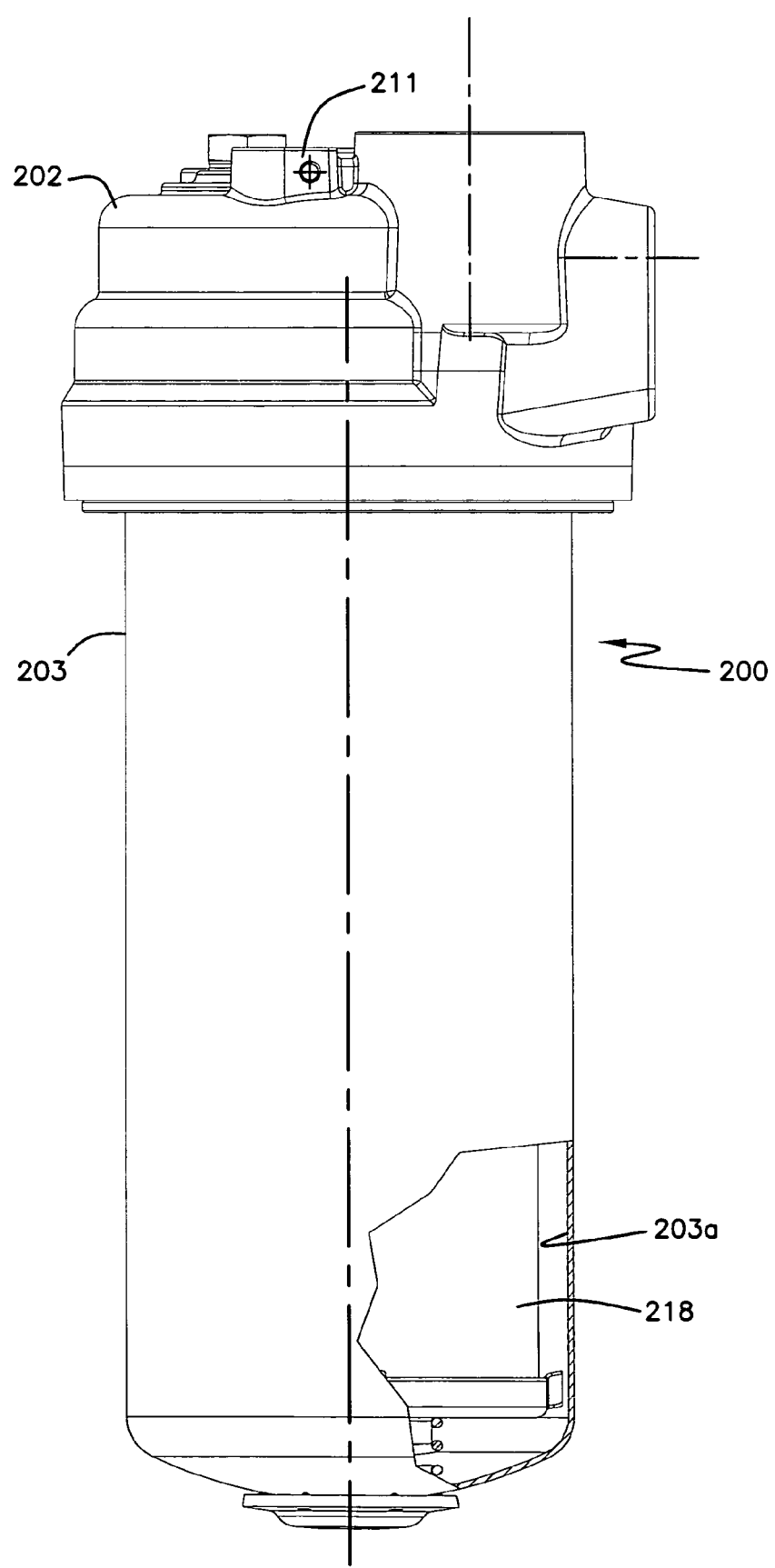
FIG. 3 is an alternate side elevational view of the filter assembly of FIG. 2.

In FIG. 3, an alternate side perspective view of filter assembly 200 is depicted. In FIG. 3, an optional sensor port 211 is shown. At this location, a variety of sensor equipment types can be connected, for proper operation of, or monitoring of, the assembly 200.

Figure 5:
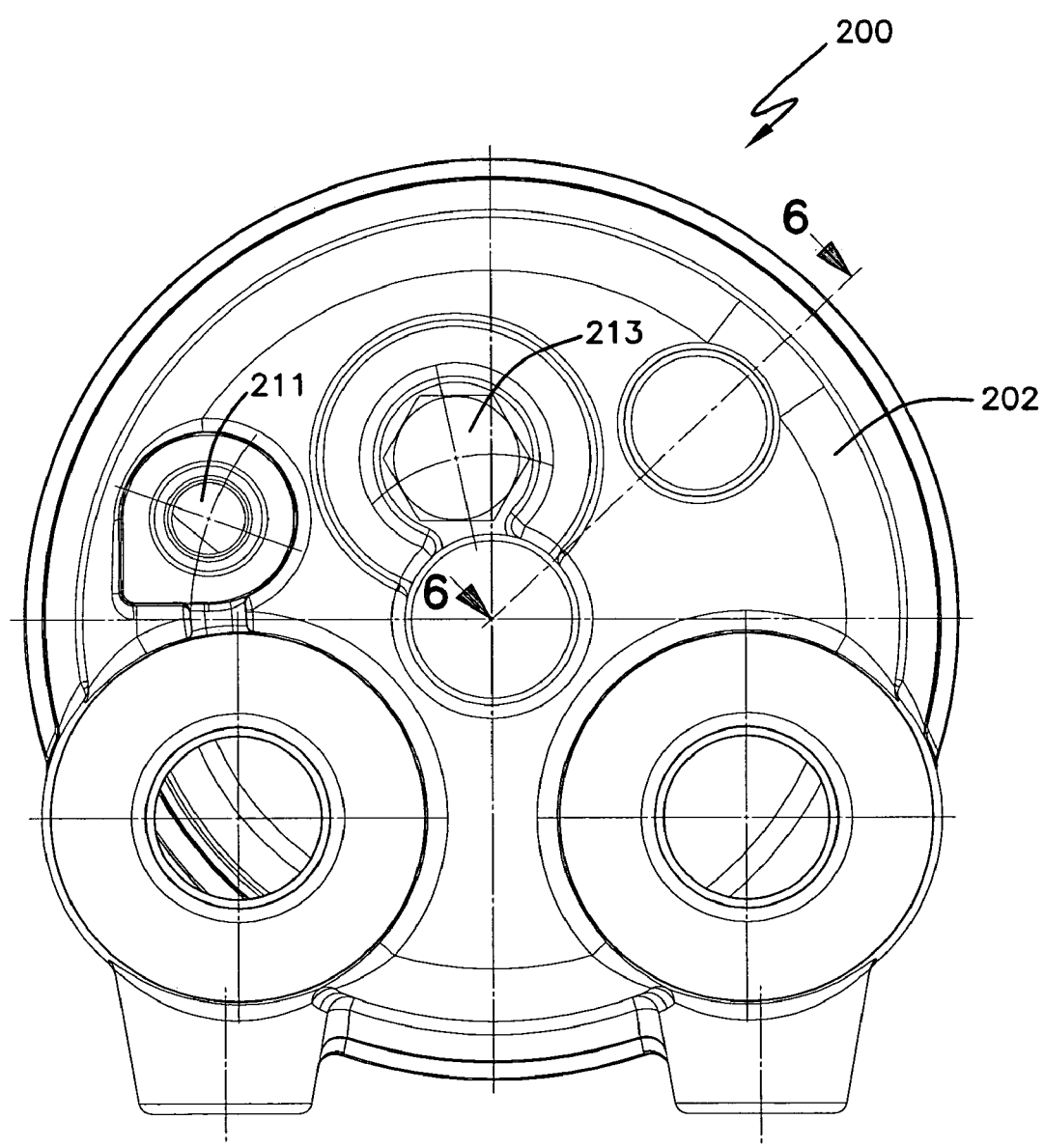
FIG. 5 is a top plan view of the assembly depicted in FIG. 4.

In FIG. 5, a top plan view of assembly 200, in a particular a top view of head 202, is depicted. An optional test port 213 is depicted.

Figure 4:
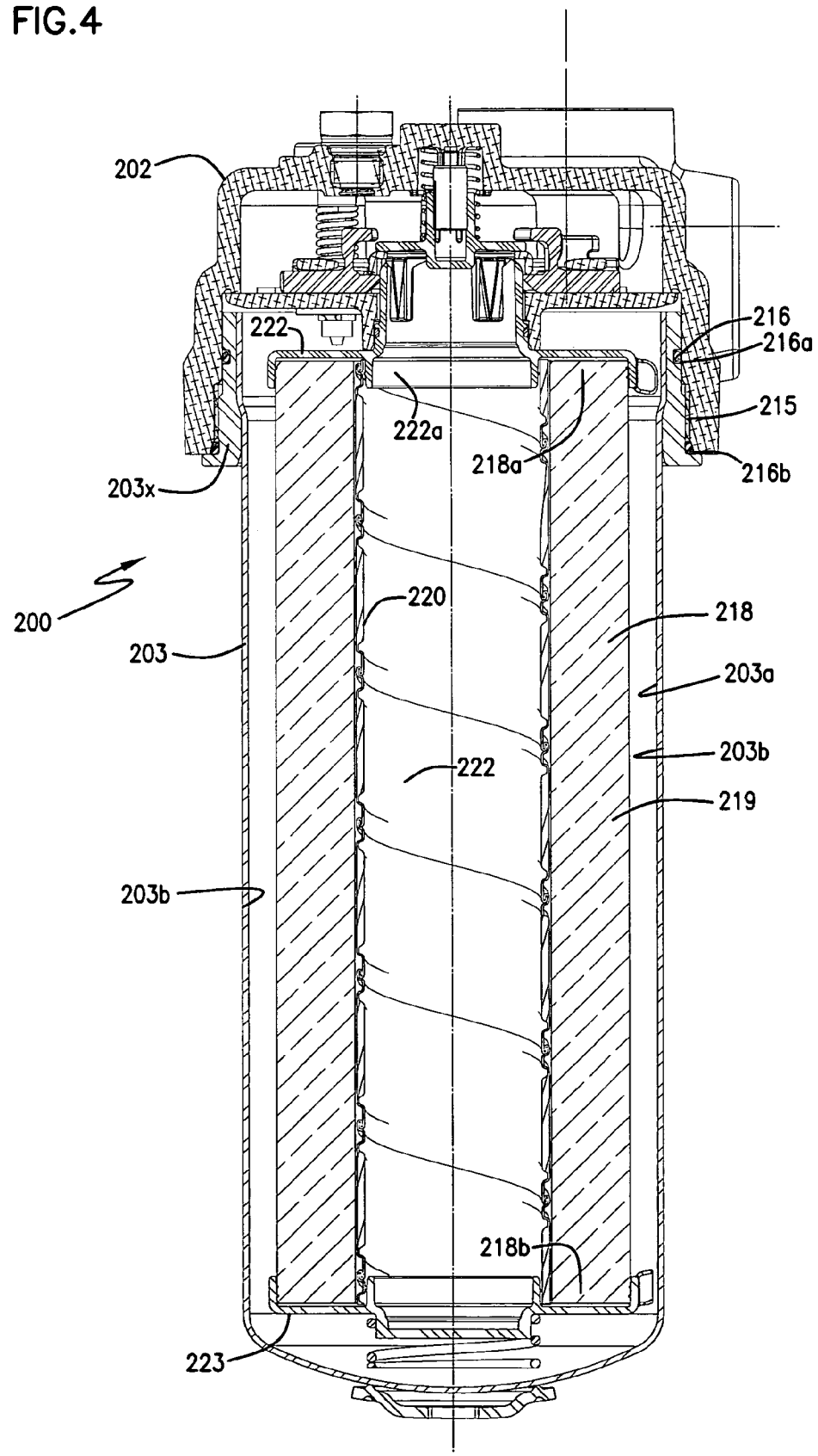
FIG. 4 is a cross-sectional view of the assembly depicted in FIGS. 2 and 3.

Attention is now directed to FIG. 4 in which filter assembly 200 is depicted in cross-section.

In FIG. 4, it can be seen that bowl 203 is removably secured to head 202, by collar 203x. In this instance a threaded connection 215 is used, with a seal provided by a seal member 216, in this example o-ring 216a. A variety of arrangements can be used for removably securing the bowl 203 to the head 202, the threaded engagement arrangement 215, with the o-ring seal 216a, merely being an example. A second o-ring 216b is shown, positioned to facilitate sealing.

Still referring to FIG. 4, within interior 203a of bowl 203, is positioned serviceable filter cartridge 218. The filter cartridge 218 is thus a service component, and can be removed from bowl 203, and be replaced therein, when bowl 203 is separated from head 202. In general, the filter cartridge 218 comprises a region of filter media 219 through which liquid is passed, during operation, for filtering. Generally liquid flow is outside to inside, with open central volume 220 comprising a clean filtered liquid volume.

The filter cartridge 218 may include a porous inner liner 221, to support the filter media 219 along an inside.

Typical filter media 219 will be pleated media, for example arranged in a cylindrical configuration, although alternatives are possible for both the media and the shape depending on the system and the needs for filtering.

Still referring to FIG. 4 and to filter cartridge 218, the media 219 has first and second opposite ends, 218a, 218b, and extends between first and second end caps 222, 223. For the particular cartridge 218 shown, end cap 222 is an open end cap, with a central aperture 222a therein. End cap 223 is closed, although alternatives are possible.

During operation, liquid to be filtered passes through head arrangement 202 into liquid annulus 203b between the bowl 203 and the filter cartridge 218. The liquid then passes through the filter cartridge 218 and filter liquid exits through aperture 222a. It then passes through an outlet in head 202, for circulation into the machinery system involved.

Figure 6:
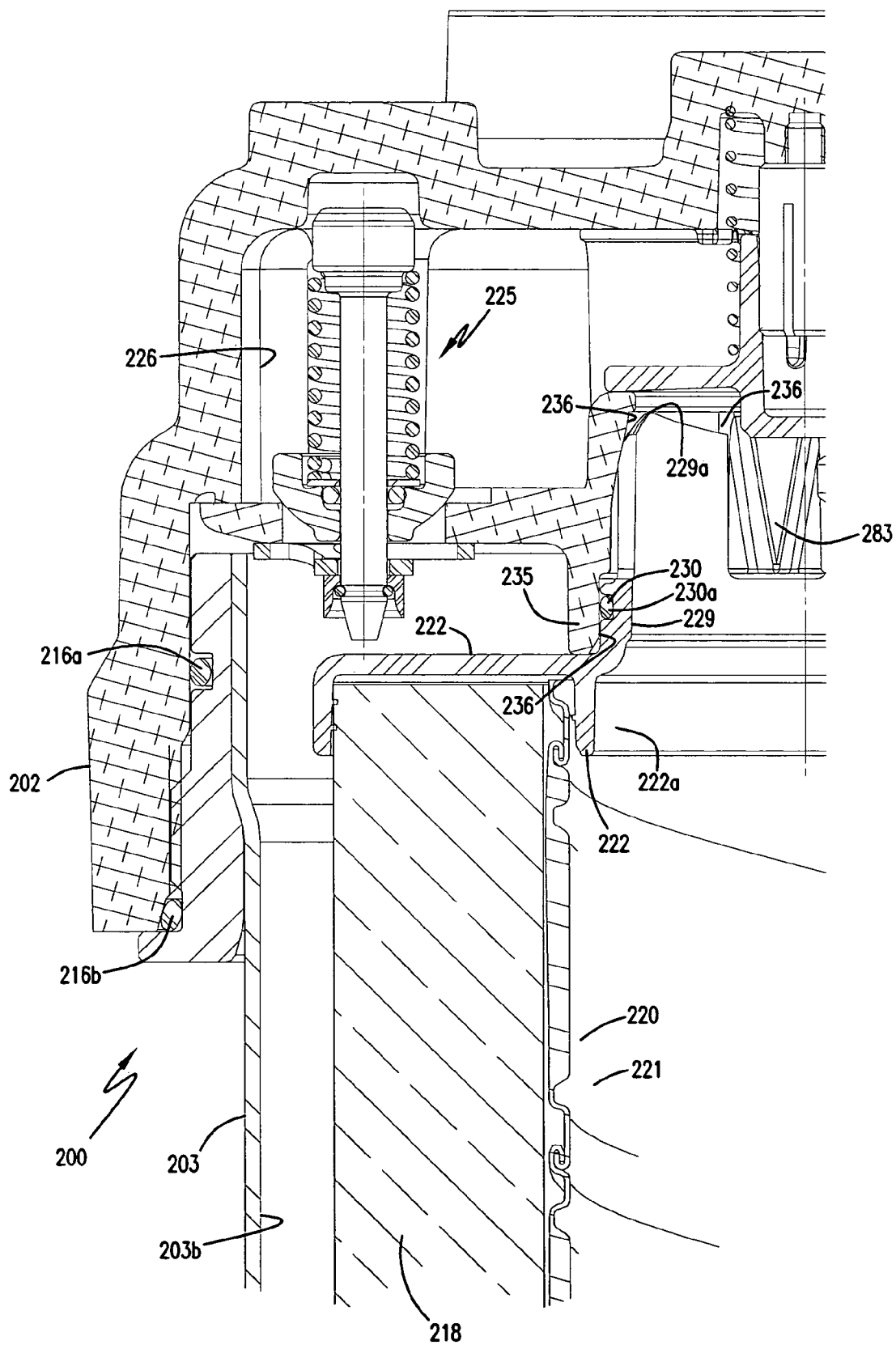
FIG. 6 is an enlarged fragmentary, cross-sectional view taken along line 6-6, FIG. 5.

Attention is directed now to FIG. 6, an enlarged fragmentary view of a portion of FIG. 4. The particular assembly 200 depicted includes a bypass valve arrangement 225. The bypass valve arrangement 225 is configured to open should the pressure in region 203b become sufficiently large, due, for example, to occlusion of the filter cartridge 218 (in particular media 219) from contaminant, during extended filtering operation. This would allow a liquid bypass flow around the filter cartridge 218, for liquid flow into region 226, and outwardly through an outlet in the filter head 202 to avoid equipment cavitation or other problems.

Referring to FIG. 6, it is noted that cartridge 218 (in the example shown end cap 222) includes an axial stem 229 thereon, with flow channel or aperture 222a extending therethrough. The stem defines a tip 229a, which operates as an anti-drain back valve opening (or actuating) tip, in use. The stem 229 includes an outer annular seal provided as a seal arrangement 230, in this instance an o-ring 230a, which extends around stem 229. When cartridge 218 is positioned for use, stem 229 is positioned inside of a filtered liquid flow channel 236 defined by projection 235 in head 202, the cartridge 218 being sealed to a seal surface defined by projection 235 by means of o-ring 230a.

From the above, general operation of the assembly 200 will be understood. Many of the features detailed herein for the examples described, relate to an anti-drain back valve arrangement and preferred interaction between the cartridge 218 and the filter head 202, in use.

Figure 7:
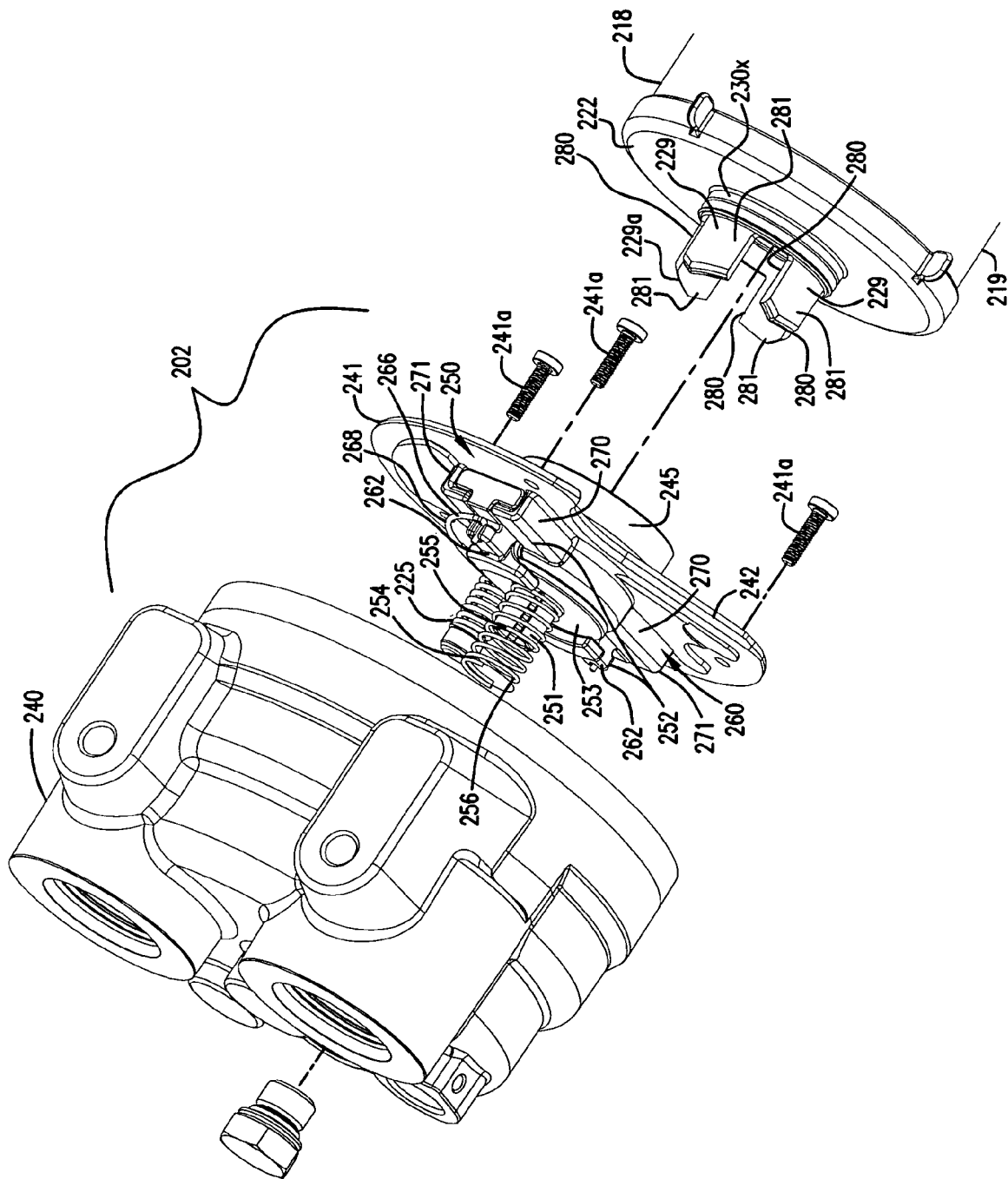
FIG. 7 is an enlarged exploded fragmentary perspective view of a portion of the assembly depicted in FIGS. 2 and 3.

Referring to FIG. 7, filter head 202 is shown in an exploded view as comprising two general components: cover 240 and plate arrangement 241. Plate arrangement 241 includes componentry of certain valve arrangements thereon, and is configured to be secured within cover 240. It is noted that during normal operation and servicing, plate arrangement 241 would not be removed from cover 240. The plate arrangement 241 can be secured in position within the cover 240 in a variety of manners including for example: by adhesive or sealant; by welding; through use of a snap ring arrangement or by other mechanical connection or interlock. The particular method of choice would depend, in part, upon the materials used and the type of servicing (the valve components) attended. The particular method is a matter of choice, for given instances of application and principles according to the present descriptions. In the example shown, bolts 241a are used, which also ensure proper relative rotational positioning of the two components. A sealant can be used, in addition, if desired.

Referring to FIG. 7, plate arrangement 241 defines passageway 242 which, in combination with cover 240, creates a channel or down corner for liquid to be filtered, to pass into annular region 203b, FIG. 4. Plate arrangement 241 further includes, mounted thereon, bypass valve arrangement 225.

Figure 8:
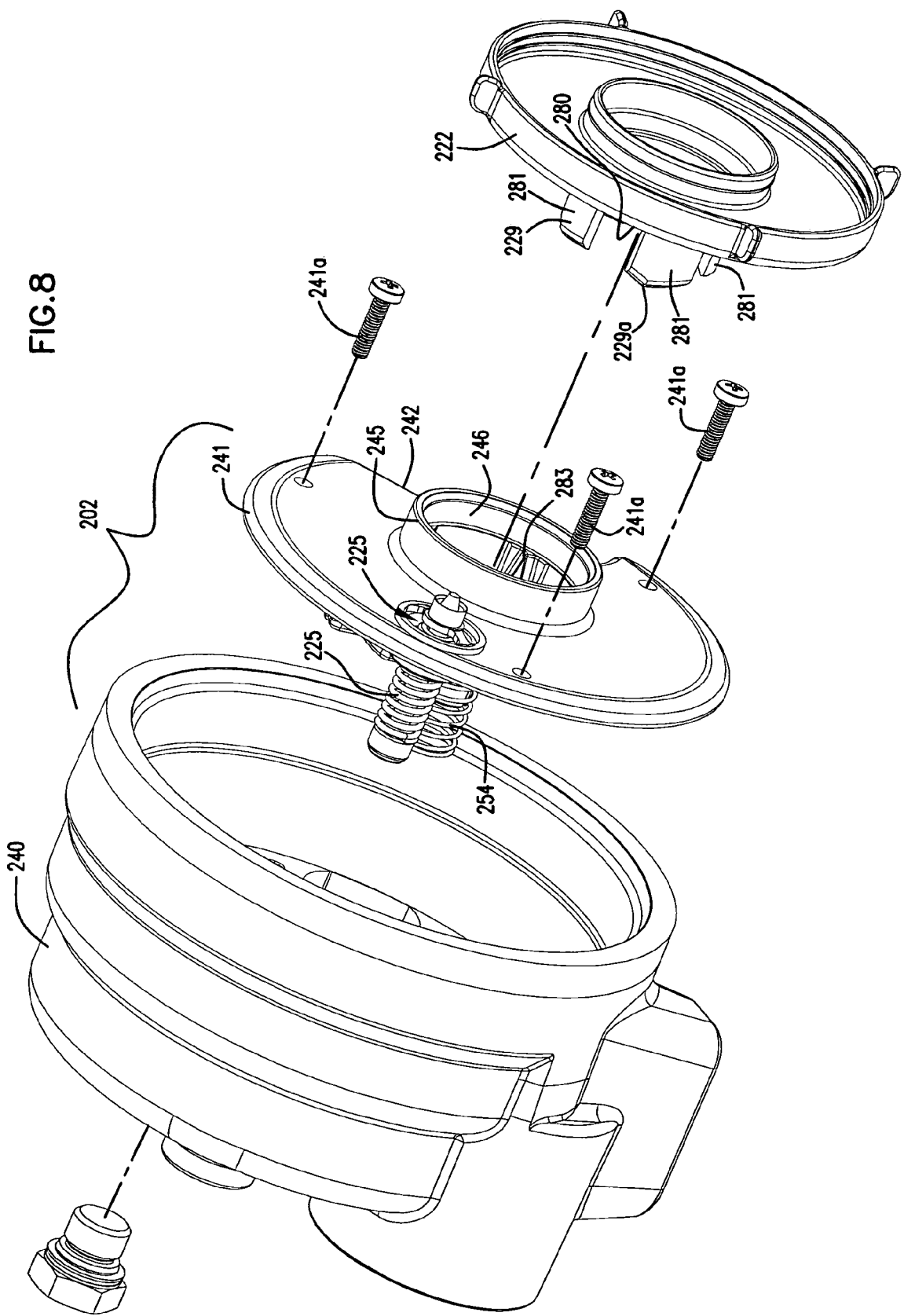
FIG. 8 is an enlarged, exploded fragmentary view of the componentry of FIG. 7, from a different perspective.

Also, plate arrangement 241 defines central projection 245. The central projection 245 defines an internal filter liquid flow channel 246, FIG. 8. That is, channel 246 operates as an exit channel for filtered liquid. Further, projection 245 operates to surround stem 229, when cartridge 218 is in position, with seal arrangement 230 sealed thereto. That is, a portion of projection 245 defining internal channel 246 is a seal surface for cartridge 218. (Projection 245 and channel 246, FIG. 8, are analogous to projection 235 and channel 236, FIG. 6.)

Referring to FIG. 7, plate 241 includes anti-drain back valve arrangement 250 thereon. The anti-drain back valve arrangement 250 includes a valve assembly 251 and a lock (safety) arrangement 252. The valve assembly 251 includes: valve piece 253 and control member 254, in this instance comprising a biasing member 255 which is configured to press the valve piece 253 over channel 246, until a closure pressure (seal pressure corresponding to the closing force of the biasing member 255) is overcome. For the example shown the biasing member 255 comprises a coiled spring 256. (The cover 240 can include an internal center guide projection, for the spring 256.)

In operation, valve piece 253 is biased by control member 254 to close aperture 246 in plate arrangement 241 to liquid drain therethrough, unless the control pressure defined by biasing member 255 is overcome by filtered liquid flow through aperture 246. Thus, valve 250 prevents drain back of liquid from head 202 through aperture 246, when filtering fluid flow is stopped.

As indicated, the particular anti-drain back valve arrangement 250 depicted, includes a lock arrangement 252, which ensures that the valve arrangement 250 is not prematurely or undesirably opened. The lock arrangement 252 comprises a moveable lock arrangement 260. The moveable lock arrangement 260 generally has a first lock orientation and a second unlocked orientation. In general the lock arrangement 260 comprises at least one, in this instance two diametrically (radially) opposed, lock or slide members 262 configured to have a first locked orientation, securing the valve member against movement away from the closed orientation; and a second unlocked orientation, in which the lock member arrangement releases the valve member to allow it to move from the closed orientation.

Figure 10:
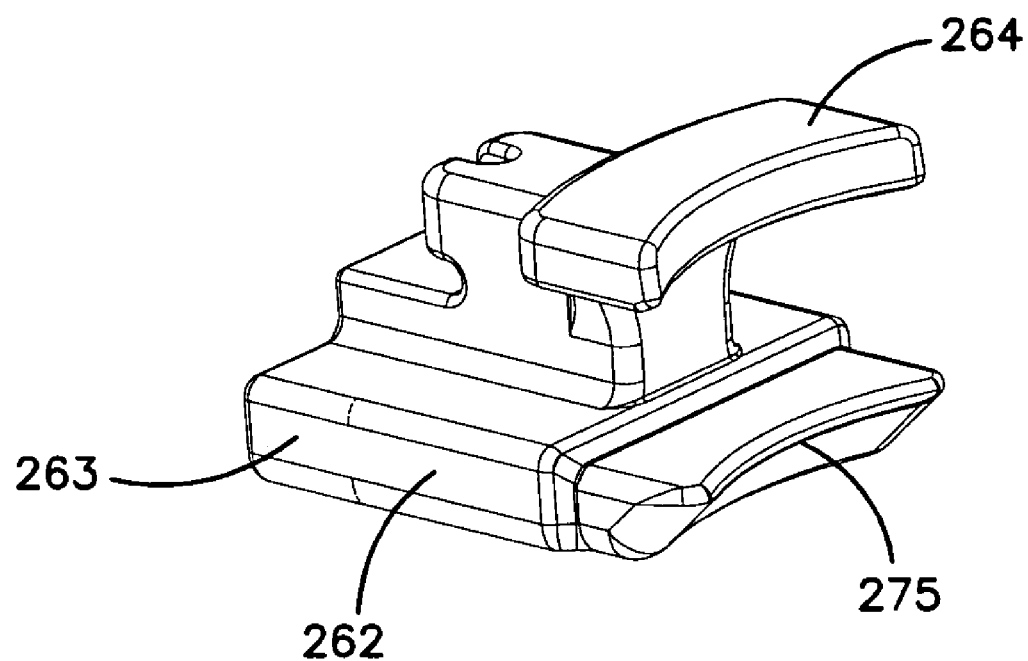
FIG. 10 is an enlarged perspective view of a locker component used in the componentry of the assembly of FIGS. 2-9.

For the particular arrangement shown, the lock or slide members 262 are identical to one another, and one is depicted in FIG. 10. The lock members 262, FIG. 10, include a slideable base 263 with a projection 264 thereon. The projection 264 is positioned and sized to engage (in this instance to extend over a portion of) valve piece 253, FIG. 7, when the lock or slide 262 has been slid to an appropriate, locked, position.

Referring to FIG. 7, the two lock or slide members 262 are depicted in the locked position. They are retained in the locked position by biasing member 266, in this instance comprising a single wire spring 268.

Each one of the two lock members 262 is slidably mounted within a slide track 270; in this example each slide track 270 being positioned on, or as part of, plate arrangement 241. The lock members 262 can be slid in the associated slide tracks 270 (in this instance formed integral with plate 241) between the locked position or orientation depicted in FIG. 7 and an open position which will correspond to the lock members 262 each being slid toward an associated end 271 of a track 270. For the lock or slide members 262 to be positioned in the open, unlocked position, i.e., biased toward ends 271, the closing force of the biasing member 266 needs to be overcome.

The biasing force of the biasing member 266 is generally overcome, i.e., the anti-drain back valve assembly is opened (positioned to open upon liquid flow) whenever an appropriate cartridge 218 is positioned within bowl 203 and the bowl 203 is secured to the head 202, by having axial stem 229 (in particular anti-drain back valve opening tip portion 229a) of the cartridge 218 engage the biasing portion, edge or surface 275, FIG. 10, of each locker or lock member 262. Preferably each surface 275 is configured as a cam surface. As the stem 229 is pushed into channel 246, and an anti-drain back valve arrangement opening tip 229a is pushed against biasing (cam) surfaces 275, FIG. 10, lock members 262 will be actuated to unlock; i.e., forced radially outwardly in slide tracks 270, against the biasing force of the biasing member 266, FIG. 7. Thus, when a cartridge 218 (having a proper stem 229) is installed, and the bowl 203 is secured to the head 202, the cartridge 218 will unlock the lock arrangement 260, "opening" or allowing the anti-drain back valve arrangement 250 to be free to operate under the biasing pressure of control member 254, in response to liquid pressures within the assembly 200.

Figure 9:
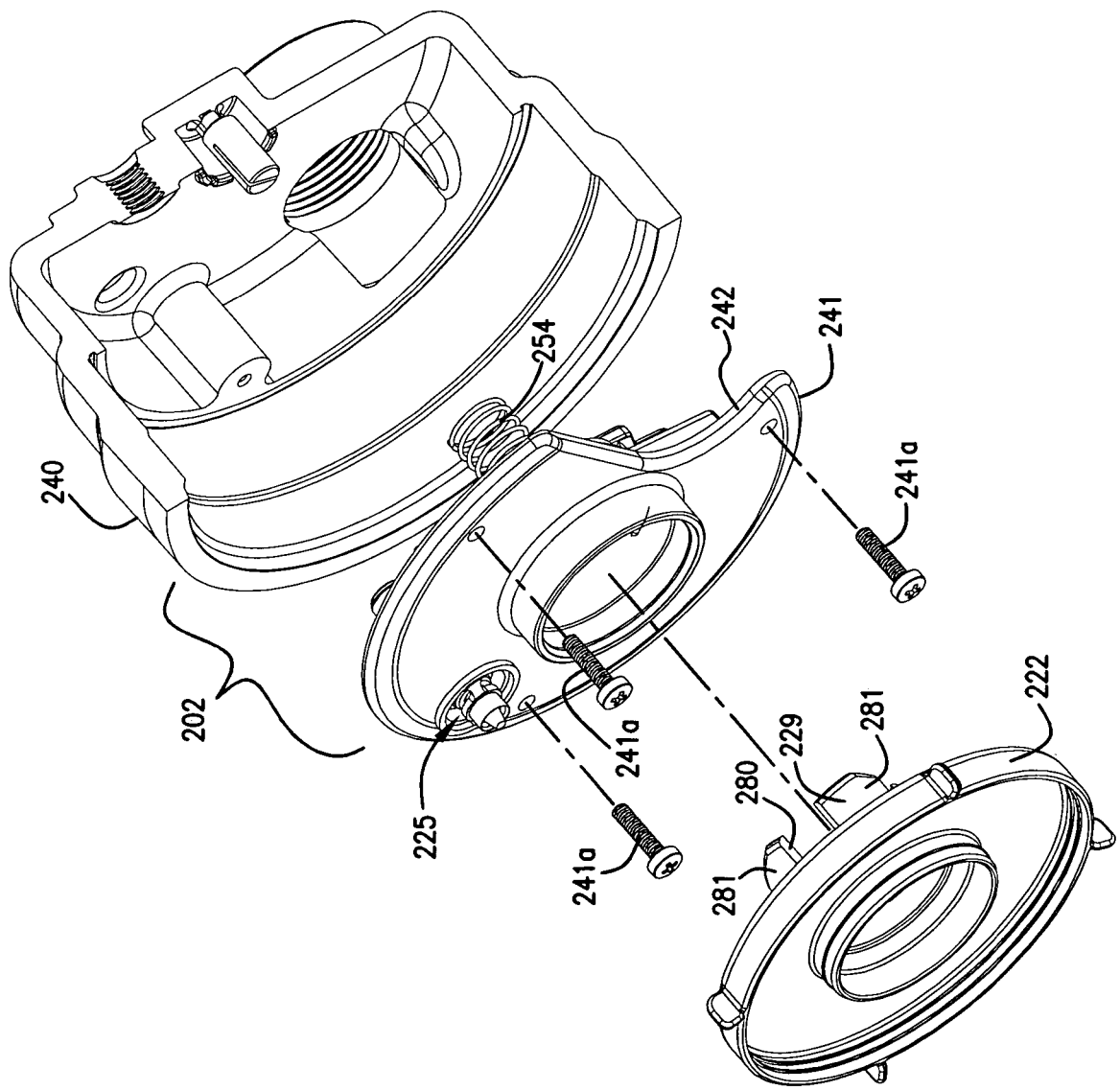
FIG. 9 is an enlarged fragmentary perspective view of the componentry of FIGS. 7 and 8, from a different perspective.

Referring to FIGS. 7-9, it is noted that the stem 229 depicted comprises a plurality of guide channels 280 and projections 281. In more general terms, the particular stem 229 depicted includes a guide channel arrangement comprising at least one, typically a plurality, in this instance at least three (for example four) channels 280. Each preferred channel communicates with an end of the stem 229 remote from the media 219 (FIG. 7) and is positioned at a location between a location 230x (where the seal 230 would be positioned) and the remote end of the stem 229. In a typical situation in which the guide channel arrangement is used, within at least one channel, projection member 245, FIG. 8, will define a filter cartridge alignment or positioning projection arrangement. The projection arrangement could include one or more projections, such as projection 283, FIG. 8. In operation, at least one of the guide channels 280 would be positioned in juxtaposition (overlap) with at least one filter cartridge alignment projection. This type of arrangement can be used to help ensure that cartridge 218 is in an appropriate position and to help prevent the cartridge 218 from rotating, as the bowl 203 is rotated during a threading operation. A variety of engagement arrangements between the stem 229 and the projection 245 can be used to accommodate this. Of course, optionally the stem 229 can be provided without such an arrangement.

Figure 11:
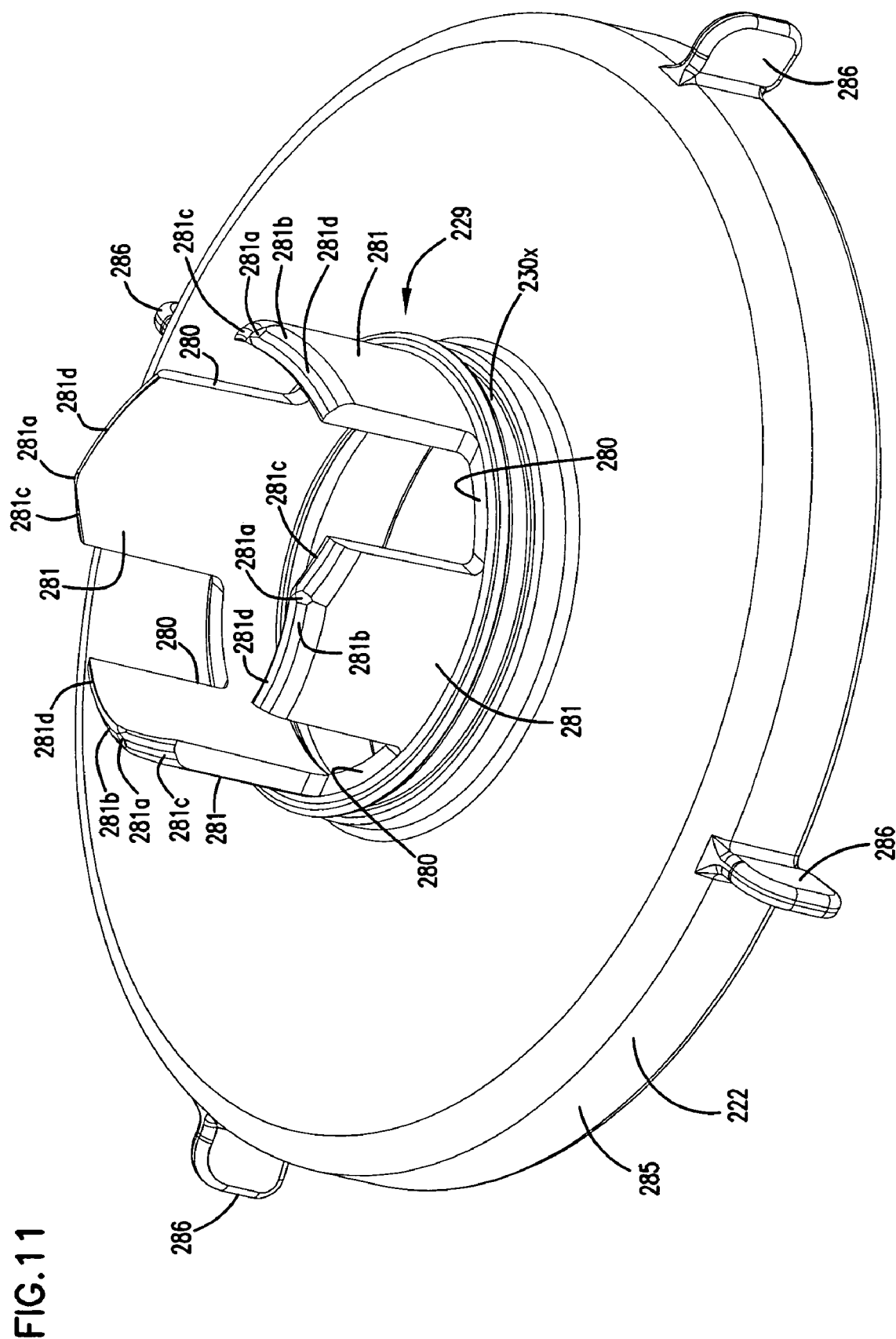
FIG. 11 is a perspective view of end cap component of a filter cartridge used in the assembly of FIGS. 2-9.

In FIG. 11, a cartridge end cap 222 is shown which includes stem 229 configured with guide channels 280 and projections 281. End cap 222 also includes an outer periphery 285 with a plurality of radial projections 286 thereon, useable as spacers to help center cartridge 218 within bowl 203, during use. In the example shown, there are four projections 286. (Also, projections 286 can be used to engage the bowl 203, and help keep cartridge 218 in the bowl 203 during servicing). Stem 229 of end cap 222, FIG. 11, preferably includes points or apices 281a, on each projection 286 instead of blunt ends. This pointed shape can be further used to ensure a proper fit between the filter cartridge and filter head. For the example shown in FIG. 11, the apices 281a are not centrally positioned on the projections 281, although alternatives are possible. The apices 281a can also be used to provide convenient actuating engagement with locks 262. An example would be with an angle (between sides 281c, 281d of each projection 286), around each apex 281a, of within the range of 110°-170°, for example 130°-150°, although alternatives are possible. Cammed (radiused or oblique) surfaces 281b also facilitate sliding engagement with cam surfaces 275 of slides 262.

Figure 12:
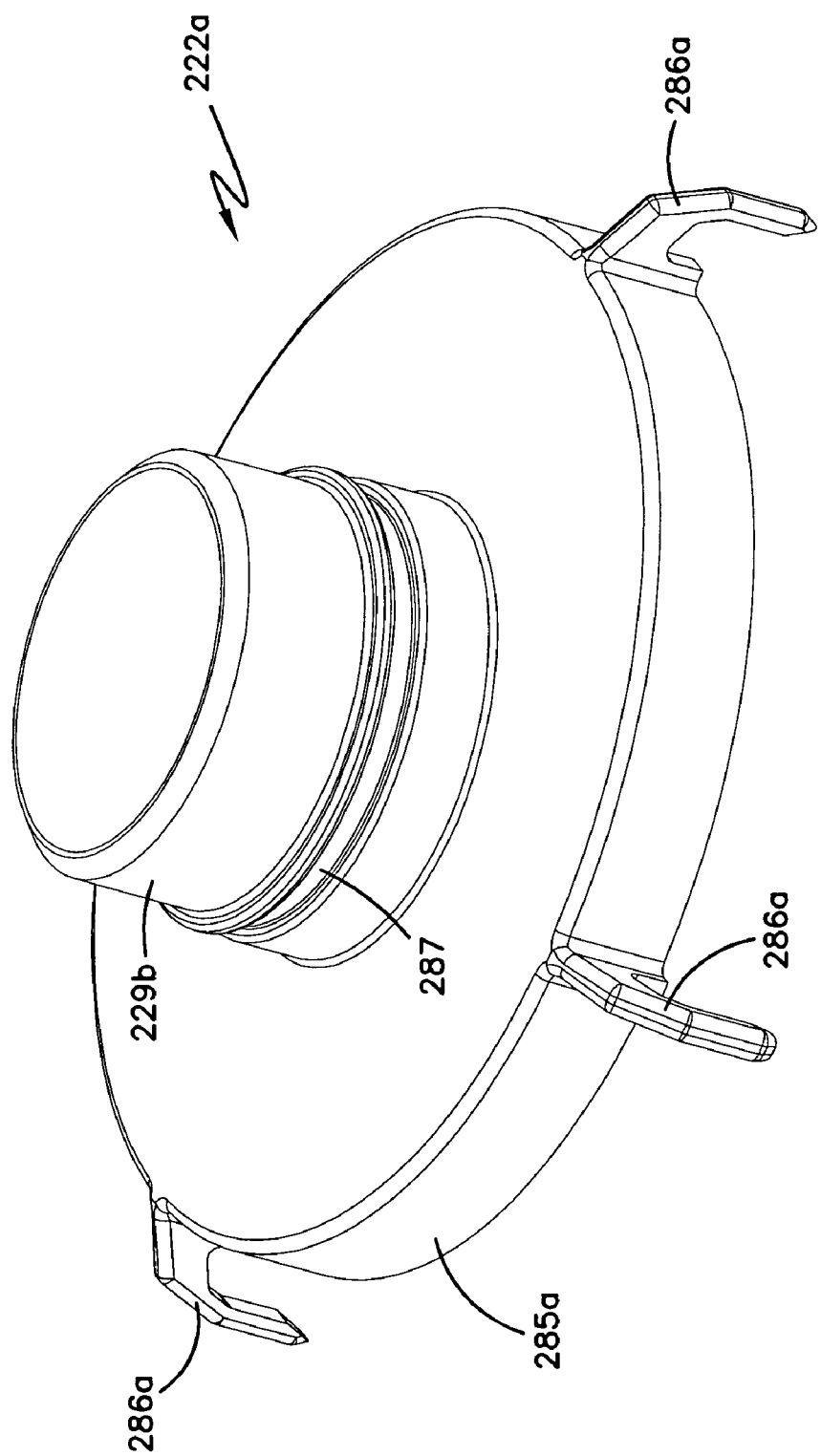
FIG. 12 is a perspective view of an alternate end cap member to the end cap member shown in FIG. 11.

In FIG. 12, an alternate end cap 222a is shown, having a stem 229b which does not include projections, and slots or guide channels therein, but does include a mounting location 287 for an o-ring. End cap 222a further includes an outer periphery 285a with spaced radial projections 286a thereon. The particular projections 286a shown here, are shaped as fingers, to engage the bowl 203. Of course if a stem such as stem 229b is used, the plate arrangement 241 should not include projection arrangement 283, FIG. 8.

Figure 13:
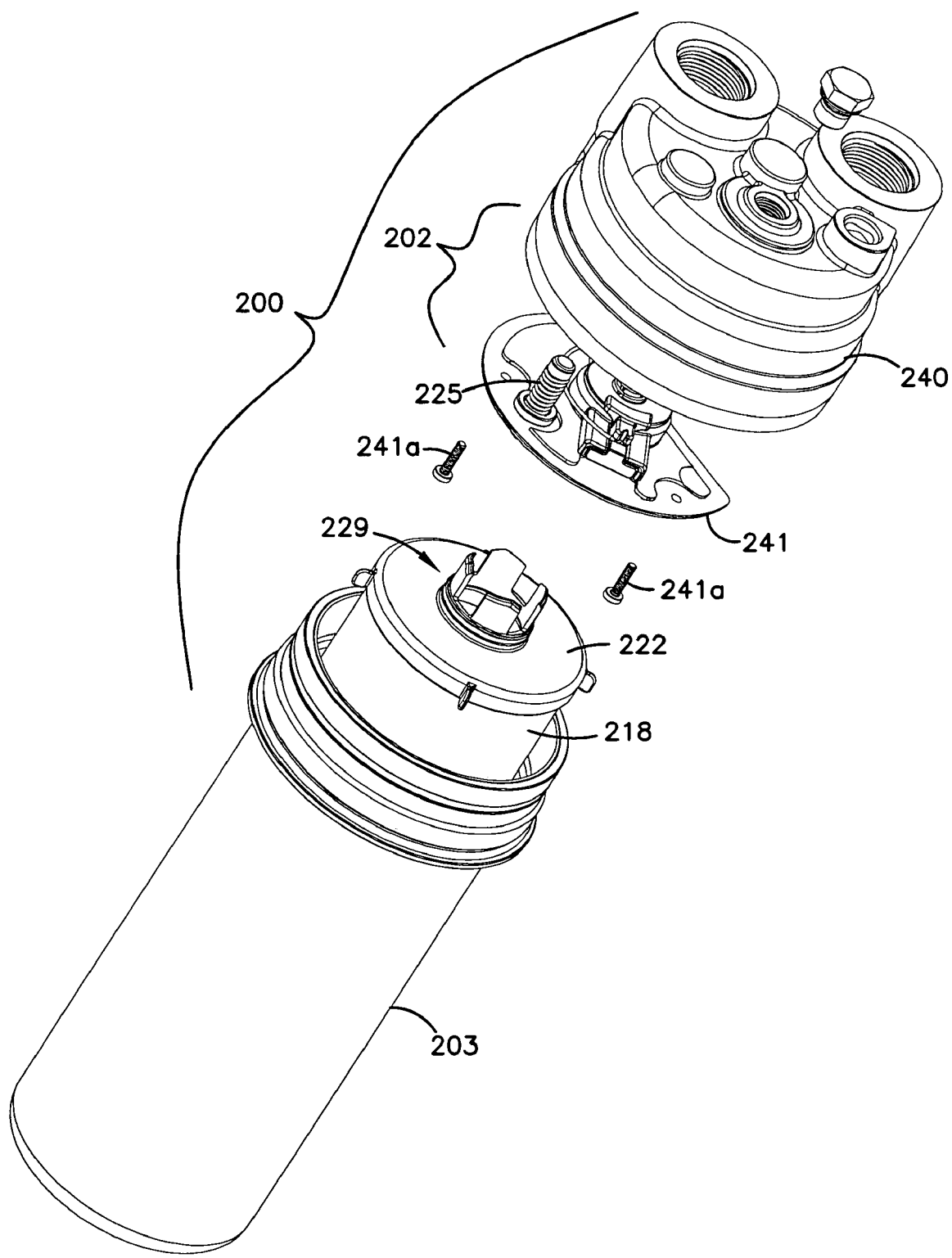
FIG. 13 is an exploded view of the assembly of FIGS. 2 and 3.

Attention is now directed to FIG. 13, in which the assembly 200 is shown exploded. From this view, further indication of how the various components align when assembled is shown.

Figure 14:
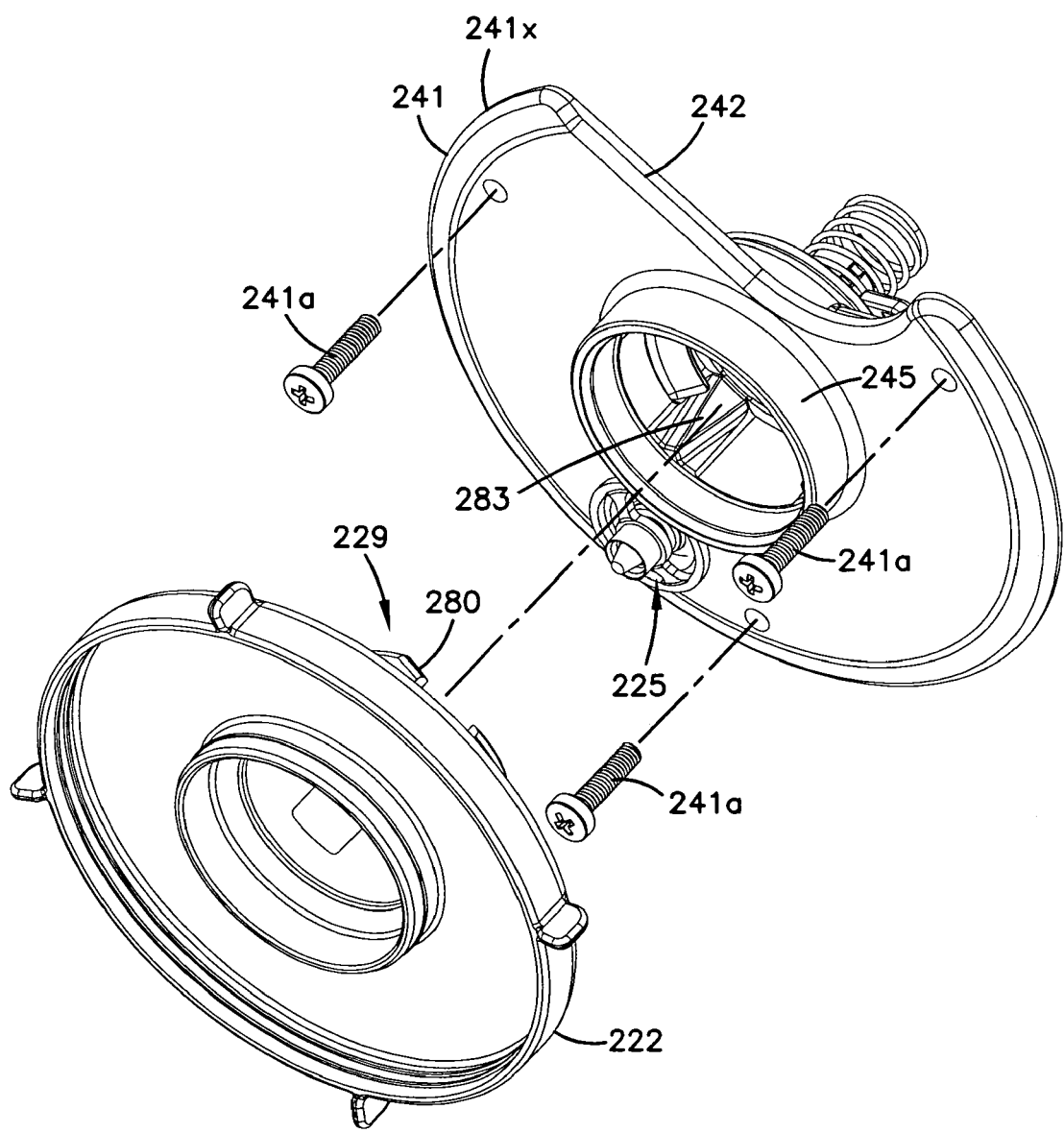
FIG. 14 is an enlarged perspective view of a portion of the assembly of FIG. 13.

Attention is now directed to FIG. 14, in which a plate arrangement 241 generally is shown, along with an end cap 222. In FIG. 14, within projection 245 is depicted v-shaped projecting member 283, although alternate shapes are possible. The projecting member 283 is shaped and positioned to point toward the filter cartridge and to be engaged by one of the guide channels 280 in stem 229 on the end cap 222. This would operate, as described previously, to inhibit rotation of a filter cartridge relative to plate 241 in use. Further it can be to help ensure that any filter cartridge installed is a proper serviceable cartridge for the system and for proper system operation. Referring to FIG. 14, it is noted that down corner channel 242 could be formed as an aperture or a slot in a remainder of plate 241, as opposed to by an internal turn in the outer perimeter of 241x of the plate 241, as shown.

Figure 15:
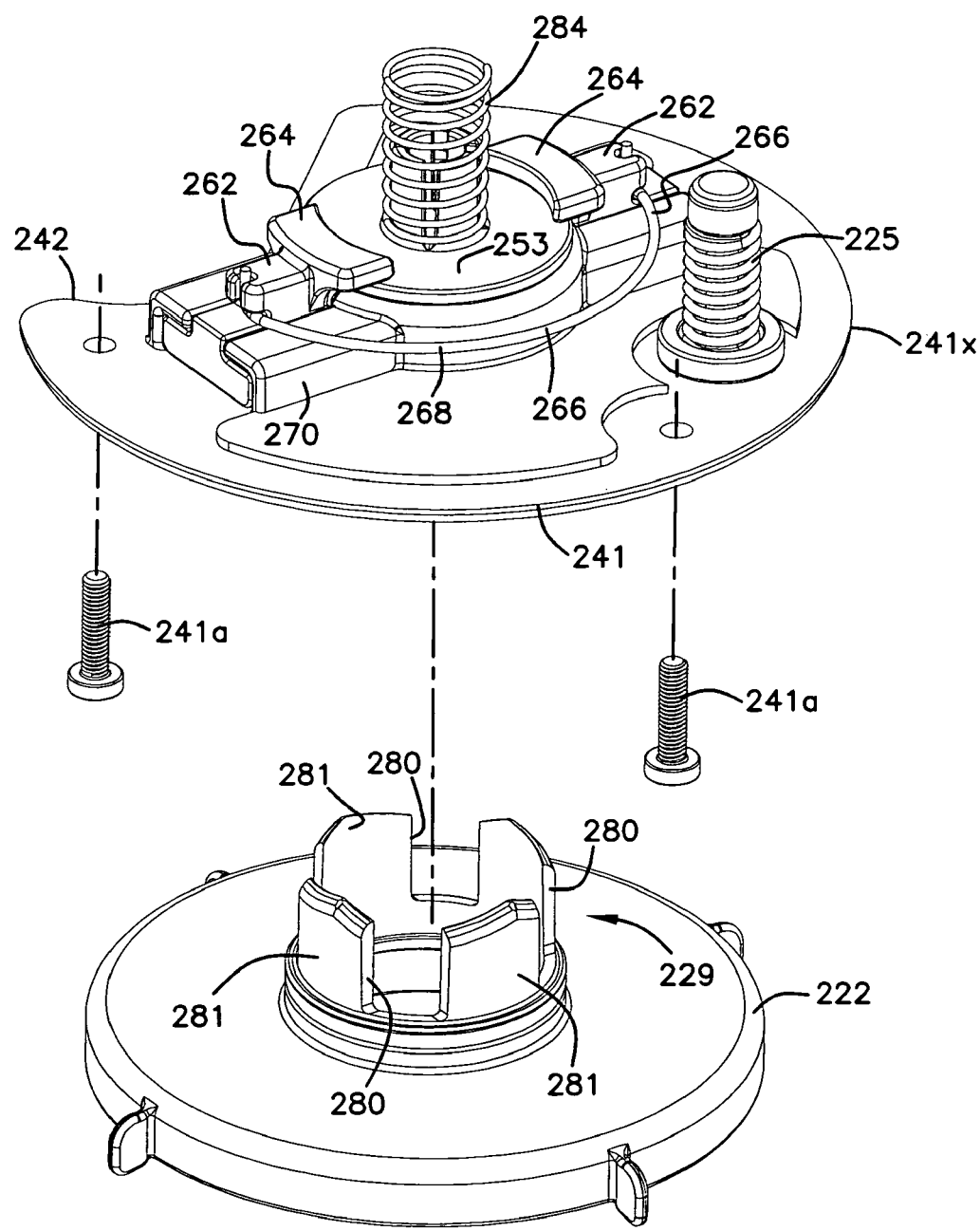
FIG. 15 is an enlarged perspective view of the componentry of FIG. 14, from a different perspective.

Referring to FIG. 15, an upper view of the components depicted in FIG. 14 is shown. Viewable are: lockers or lock members 262 (in a locked orientation); bypass valve arrangement 225; biasing member or control member 254; and, valve piece 253. Also, central spring 268 for sliders 262 is shown.

Figure 16:
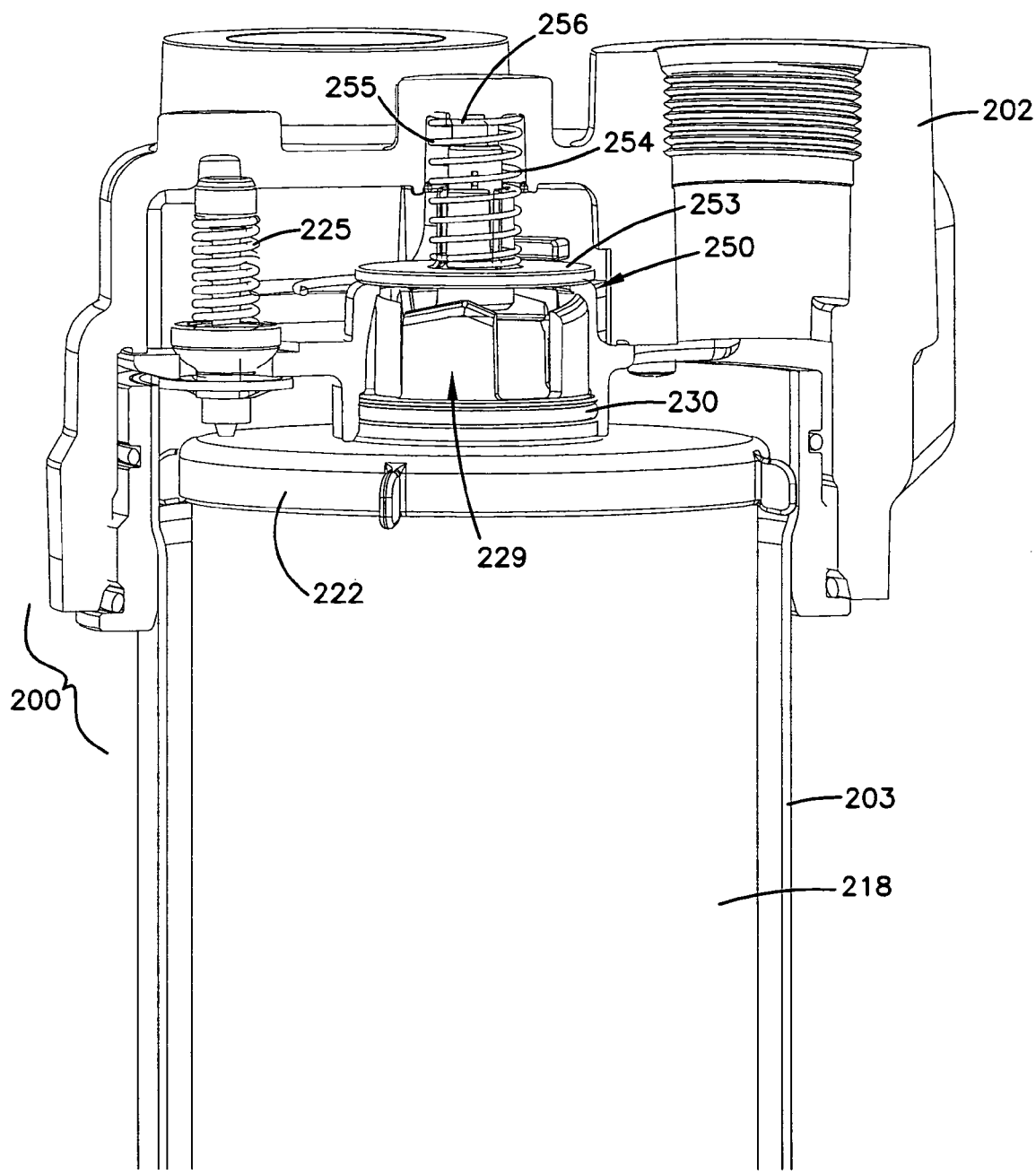
FIG. 16 is an enlarged fragmentary view with portions broken away, of the assembly depicted in FIGS. 2 and 3.

In FIG. 16, an enlarged fragmentary view, shown with portions broken away, of assembly 200 is depicted. Here, the lockers (262, FIG. 15) are in an unlocked orientation, and the valve arrangement 250 is open.

Figure 17:
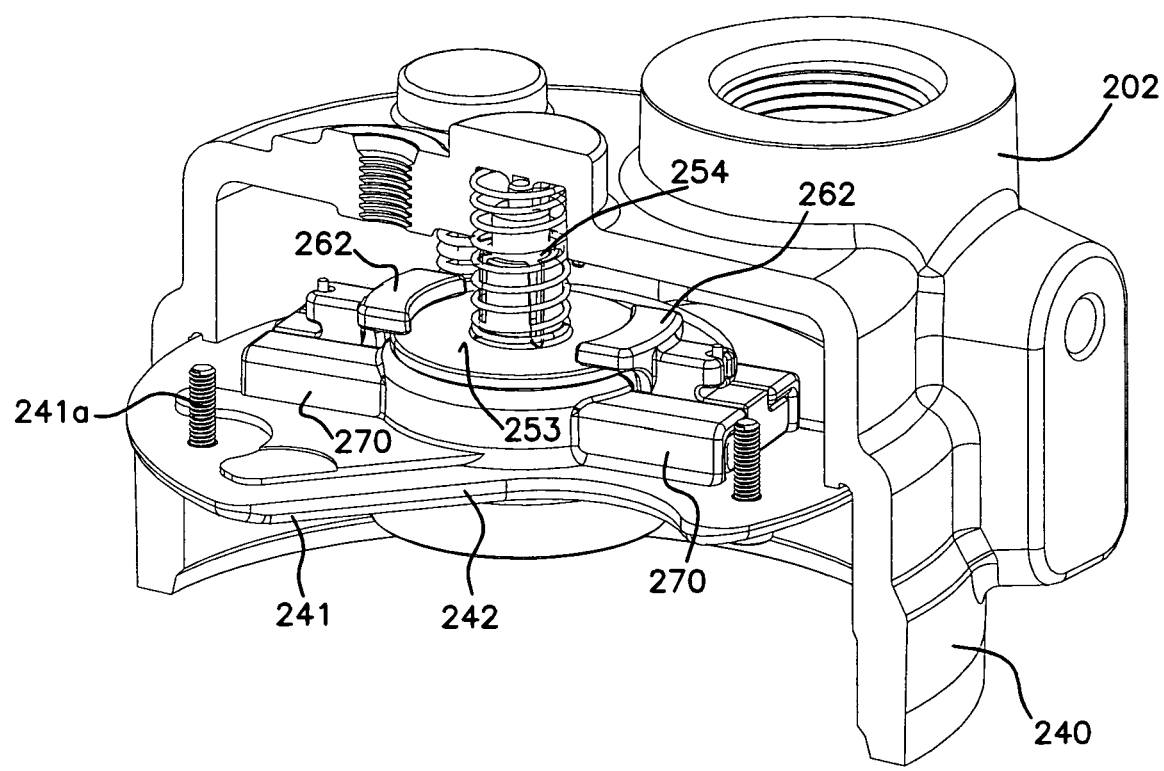
FIG. 17 is an enlarged fragmentary view of a portion of the componentry depicted in FIG. 16.

In FIG. 17 an enlarged fragmentary view of a head assembly 202 comprising a cover 240 and plate 241 I shown. The arrangement 202 is in a locked orientation.

Figure 18:
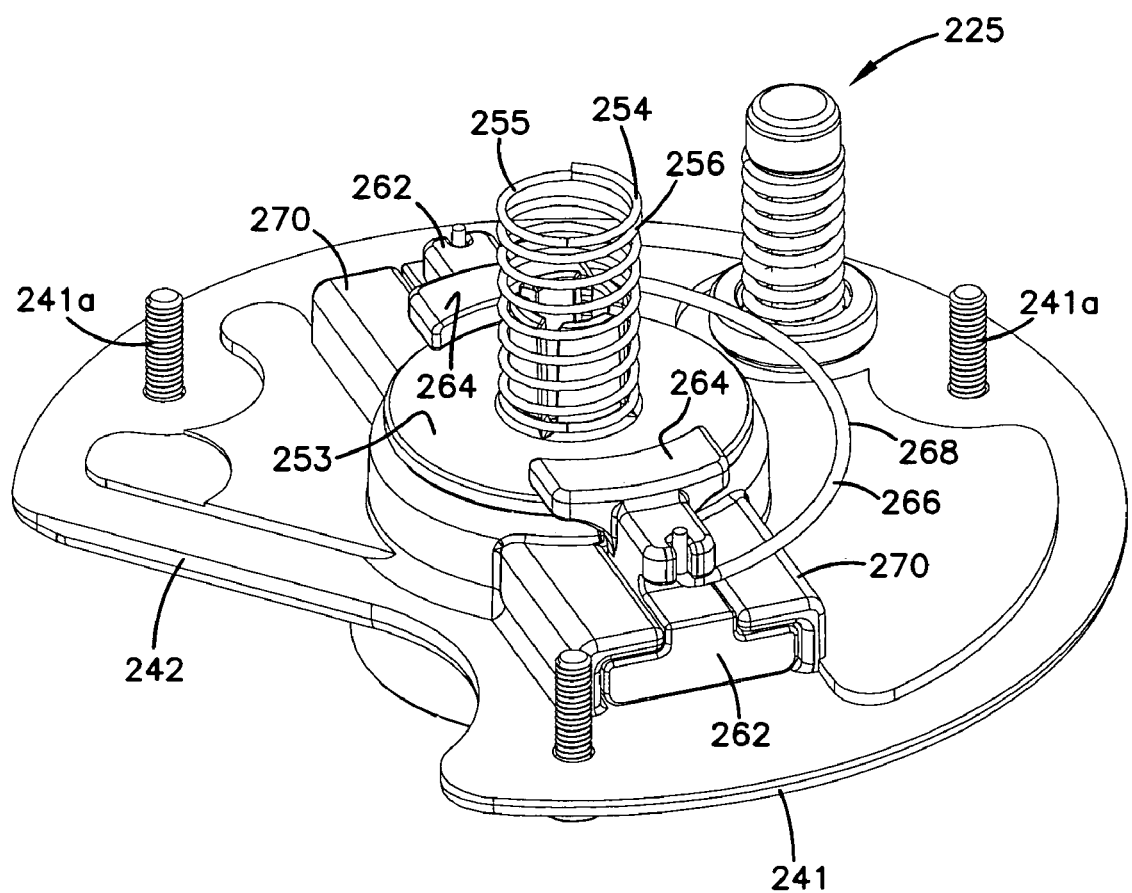
FIG. 18 is an enlarged perspective view of a portion of the componentry depicted in FIG. 17.
Figure 19:
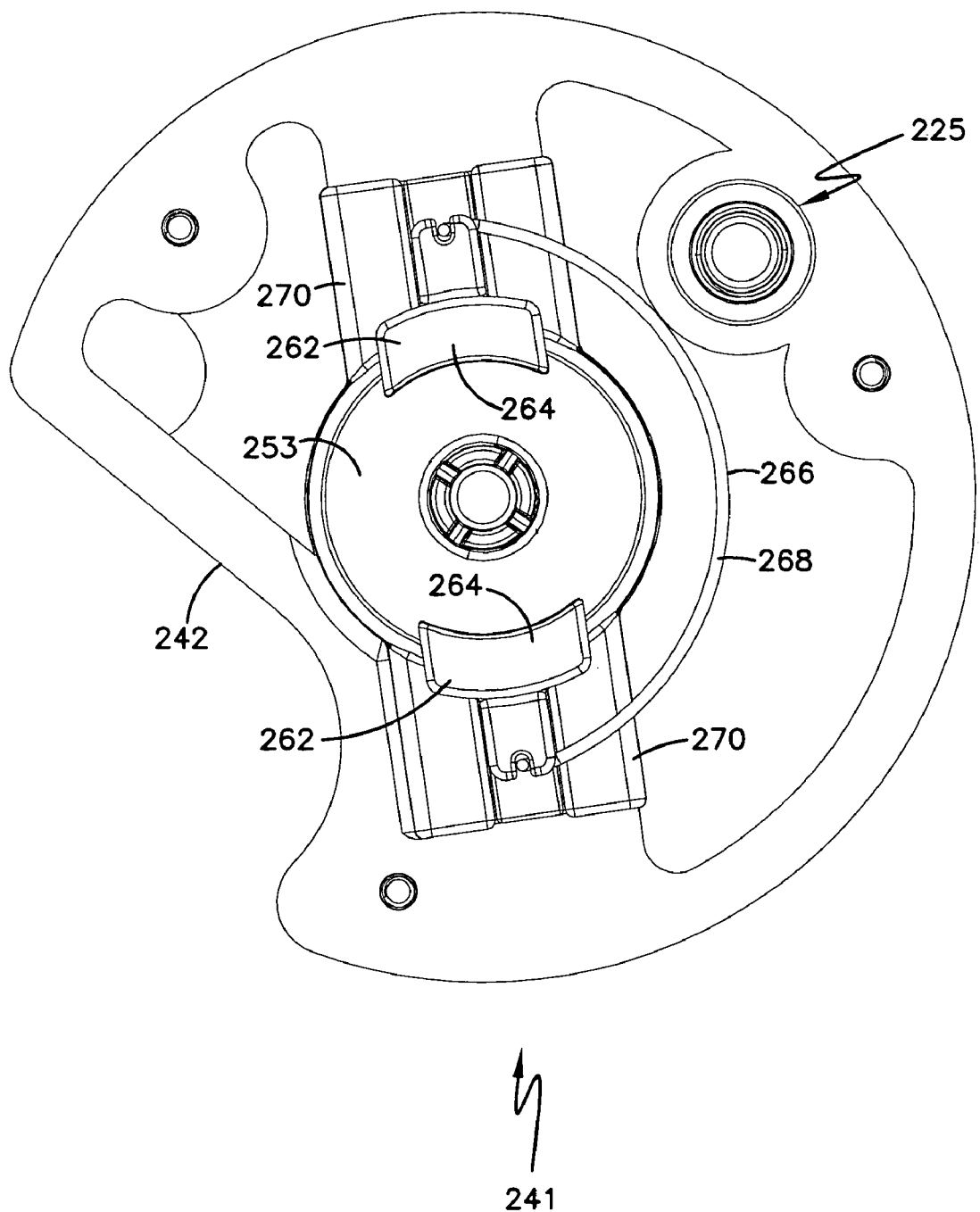
FIG. 19 is a top plan view of the componentry depicted in FIG. 18.

In FIG. 18, a top perspective view of plate 241 is shown. In FIG. 19, a top plan view of plate 241 is shown.

B. Summary of Features and Operation Principles

In general, according to certain aspects of the present disclosure a filter cartridge for use as a serviceable filter cartridge in a liquid filter assembly having an anti-drain back valve arrangement is provided. The filter cartridge generally comprises a region of filter media defining a central open volume, the region of filter media having first and second ends. The filter cartridge includes a first end cap secured to the first end of the region of filter media. The cartridge includes an axial stem thereon (typically on the first end cap) defining a central liquid flow conduit therethrough, in liquid flow communication with a central open volume defined by the filter media. At least a portion of the axial stem projects away from the filter media. An end of the stem remote from the media is configured to operate as an anti-drain back valve arrangement opening (or unlocking) tip. By "opening" in this context it is meant that the tip, when properly positioned, allows the anti-drain back valve to operate in an open position. The actual valve opening may be by fluid flow pressure.

The axial stem includes an outer annular seal arrangement thereon. A typical outer annular seal arrangement would comprise an o-ring seal positioned within a o-ring seal mounting groove on the stem.

Again, an end of the axial stem remote from the filter media would typically comprise an anti-drain back valve arrangement opening tip. That is, it would be configured and positioned so that when pushed into an appropriate receiver of a liquid filter assembly having an anti-drain back valve arrangement, it would disengage a lock arrangement to allow an anti-drain back valve arrangement to become open. Of course, again, actual opening of a preferred anti-drain back valve would be as a result of pressure from liquid flow through the system.

The second end cap would typically be secured to the second end of the filter media.

In a typical such filter cartridge, the anti-drain back valve arrangement opening tip would be positioned axially spaced from the annular seal arrangement.

Although alternatives are possible, for typical examples shown, the annular seal arrangement comprises an o-ring seal member, the filter media comprises pleated filter media, the second end cap is a closed end cap, and the filter media generally defines a cylindrical shape. Further, an inner liner would be positioned within the region surrounded by filter media, in typical applications.

An option described herein for the axial stem is a guide channel arrangement including at least one guide channel therein, positioned at a location between the o-ring seal member and the anti-drain back valve arrangement opening tip. The at least one guide channel would terminate at the anti-drain back valve arrangement opening tip, with at least one guide channel positioned to operably engage, juxtaposed or aligned over) a filter cartridge locating a projection arrangement within a valve assembly, during use. This can be used to help properly position a filter cartridge and retain the filter cartridge in that position, during use.

Also according to the present disclosure a filter head arrangement for a filter assembly is described. The filter head arrangement generally comprises a cover member and a plate arrangement secured in the cover member and defining an unfiltered liquid flow channel in a central filtered liquid flow channel. The central filtered liquid flow channel includes a flow exit aperture.

The filter head arrangement further includes an anti-drain back valve arrangement including a valve assembly. The valve assembly includes a valve member and a biasing member. The assembly is constructed and arranged that the valve member has a first closed orientation and a second open orientation. When configured in the first closed orientation the valve member is biased to close the exit aperture of the filtered liquid flow channel, by the biasing member. The biasing member preferably comprises a coiled spring or other valve operation member which will allow opening of the exit flow aperture, under a selected or desired liquid flow pressure through the liquid flow channel during use.

Preferred filter head arrangements according to the present disclosure are configured such that the anti-drain back valve arrangement further includes a lock arrangement comprising a moveable lock (slide) member arrangement having a first locked orientation and a second unlocked orientation. The lock member arrangement, within the first locked orientation, is configured to secure the valve member against movement from the closed orientation toward the open orientation. The lock member arrangement is moveable into the second unlocked orientation, to release the valve member to allow movement from the closed orientation under liquid flow pressure.

The lock arrangement preferably includes an actuator arrangement for moving the lock arrangement from the locked orientation to the unlocked orientation, upon engagement with an appropriate filter cartridge (in operable position in association with the filter head during use). In general this is accomplished by providing a lock arrangement in the form of one or more sliders, each having an engagement portion for engagement with a portion (including a tip) of an axial stem on a filter cartridge, when the filter cartridge is sealed in position with the axial stem projecting to the liquid flow channel of the plate arrangement.

The lock member arrangement preferably comprises two slide members oppositely (radially) positioned within a slide track arrangement, for radial sliding between open (unlocked) orientation and closed (locked) orientations. The movement of the lock members, and biasing toward the locked positions, can be controlled with a single wire spring.

A particular preferred configurations for slide or lock members is described and shown herein.

An arrangement in which there is positioned (within the filtered liquid flow channel of the plate arrangement) a cartridge positioning and projection arrangement is described. This arrangement can be engaged or be juxtaposed by a guide channel arrangement provided in the axial stem of the filter cartridge, if desired.

There is also described herein a filter assembly generally comprising a filter head assembly having selected features from those characterized; a filter bowl releasably mounted on the filter head, for example by a threaded engagement mechanism; and, a filter cartridge having features generally in accord with those described herein, operably positioned within the filter bowl with: an annular (for example, o-ring) seal member on the filter cartridge axial stem sealed within the central filtered liquid flow channel of the plate arrangement; and, with the axial stem of the first end cap of the filter cartridge engaging the lock member arrangement of the anti-drain back valve arrangement, to bias the lock members out of the locked orientation to the unlocked orientation.

There are also provided methods of use including a method of locking an anti-drain back valve arrangement comprising separating the filter bowl of the filter assembly from the filter head and pulling the axial stem of the filter cartridge out of the filtered liquid flow channel of the plate arrangement, to allow the lock members of the lock arrangement to bias into the locked orientation. There is further provided a method of unlocking an anti-drain back valve arrangement comprising the opposite, i.e., pushing the axial stem of the filter cartridge into a filtered liquid flow channel of a plate arrangement as described, while sealing the filter cartridge in place and pushing or biasing lock members or slide members of an anti-drain back valve arrangement out of a locking orientation.

A variety of materials can be utilized for arrangements as described. An example would be to use cast aluminum to form the cover, the plate and the track in the filter head, and plastic for the end cap on the filter cartridge and the lockers. Alternate materials can be used, however. For example, the lockers could also be aluminum.

The equipment described can be used in a variety of applications. An example application would be as a hydraulic filter or hydraulic fluid line of equipment such as agriculture tractors and construction equipment.

It is noted that in typical applications, an indicator arrangement will be utilized to show, as a result of information from a sensor equipment, the status of the system to the vehicle operator. For example, an indicator light can be used to show when pressure within the valve assembly has reached an undesirable level, for example due to the fact that the anti-drain back valve is locked close, and fluid pressure builds up with an annular region 203b as a result.

III. Additional Discussion of Features and Possible Features, FIGS. 20-24

Figure 20:
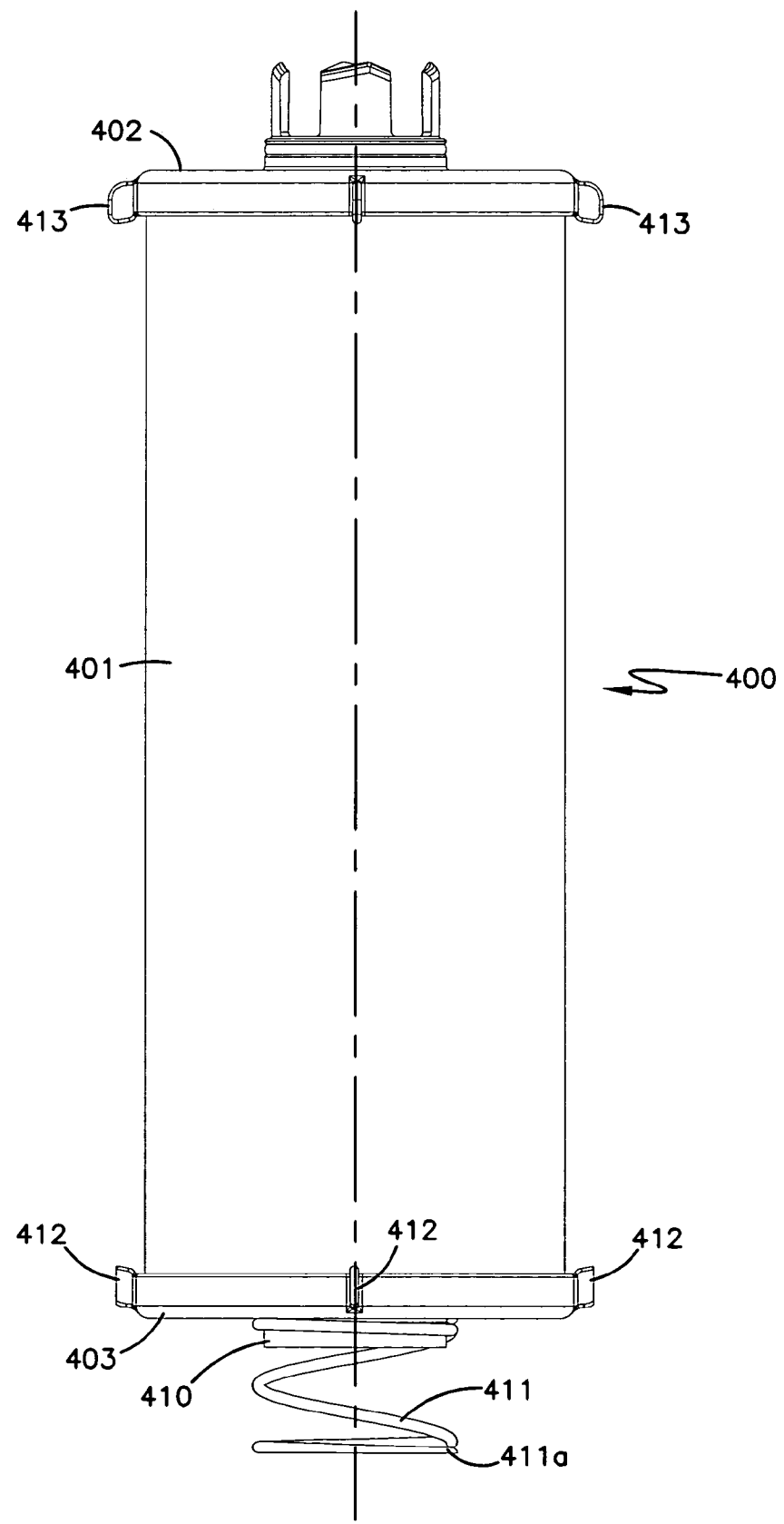
FIG. 20 is a side elevational view of a filter cartridge useable in the assembly of FIGS. 2 and 3.

Attention is first directed to FIG. 20. Reference numeral 400, FIG. 20, indicates a liquid filter cartridge. The cartridge 400 depicted can be analogous to cartridge 218, FIG. 4.

Filter cartridge 400 generally includes media 401 extending between end caps 402 and 403. These features can be generally as described with respect to the arrangements discussed in connection with the assembly of FIG. 4.

End cap 403 is a closed end cap with a projection 410 and a biasing arrangement 411, in this instance comprising spring 411a thereon; i.e., secured thereto. The biasing arrangement 411, in this instance spring 411a helps support the cartridge 400 within a housing, during use, to project upwardly above a bottom of a housing in a desirable manner. In particular, the biasing arrangement 411 will push the cartridge, above the bottom of the housing, when the housing first is brought into engagement with the filter head, to help push portions of the cartridge up into an engagement arrangement with the filter head and to help unlock the filter head for use in accord with the general descriptions previously made. On the other hand, the biasing arrangement 411, will generally compress or collapse as the housing is screwed onto the head, to facilitate overall assembly.

The particular spring 411 depicted, could be a coiled spring, however alternate arrangements can be used. Both metal and plastic arrangements could be used. With plastic arrangements, the biasing arrangement 411 could be molded as part of end cap 403.

It is also noted that end cap 403 includes spaced radially outwardly directed projections 412 thereon, for centering within a housing, during use.

Attention is now directed to end cap 402. End cap 402 also includes spaced radially outwardly directed projections 413 for centering. It is noted that a similar such projections are shown for example, on end cap 222, FIGS. 1 and 4. End cap 402 is similar to the arrangement shown in FIG. 4.

Figure 21:
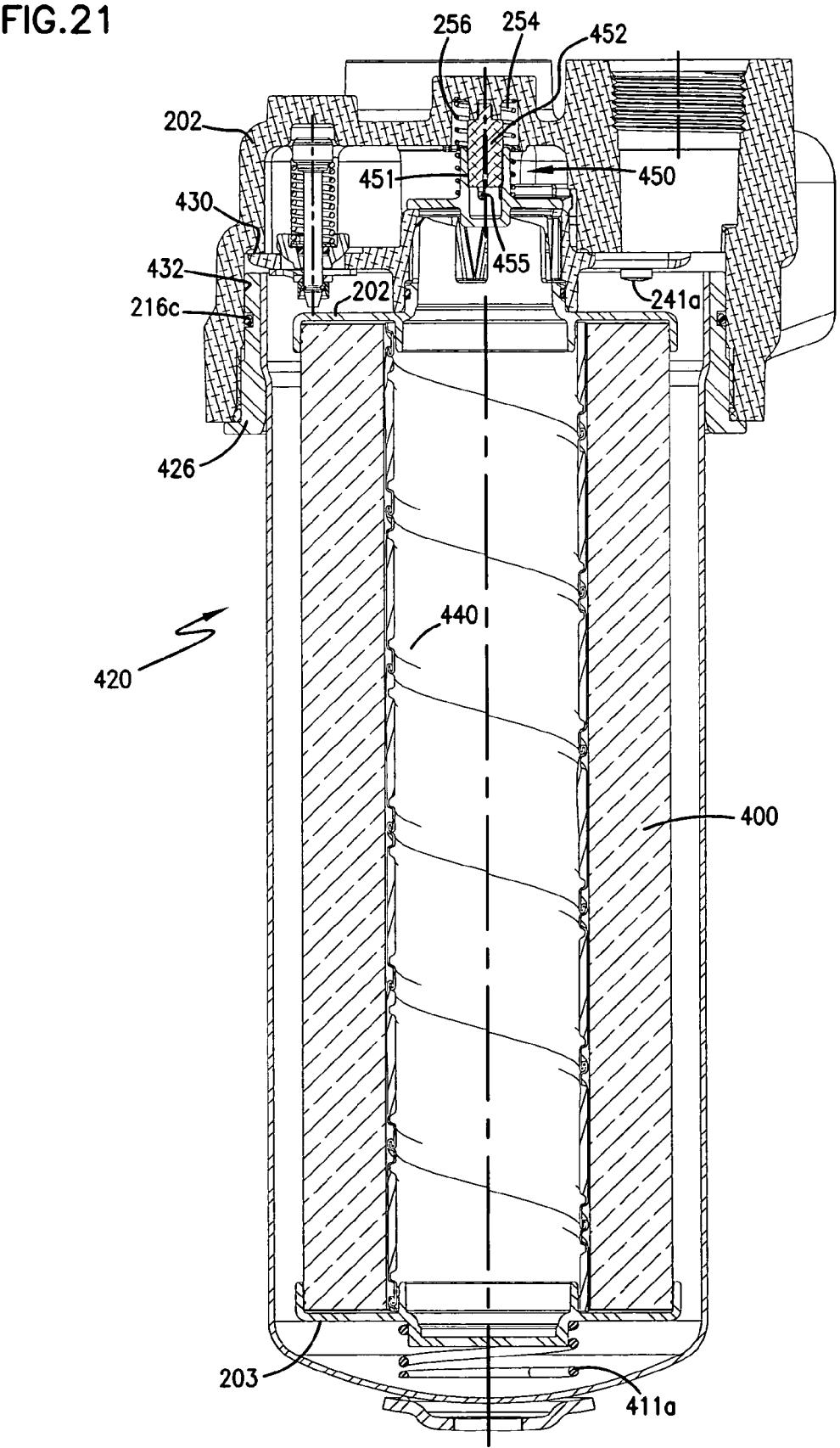
FIG. 21 is a cross-sectional view generally analogous to FIG. 4.

In FIG. 21, assembly 420 is depicted with cartridge 400 positioned therein. Features are generally analogous to those discussed above with respect to other figures.

Figure 22:
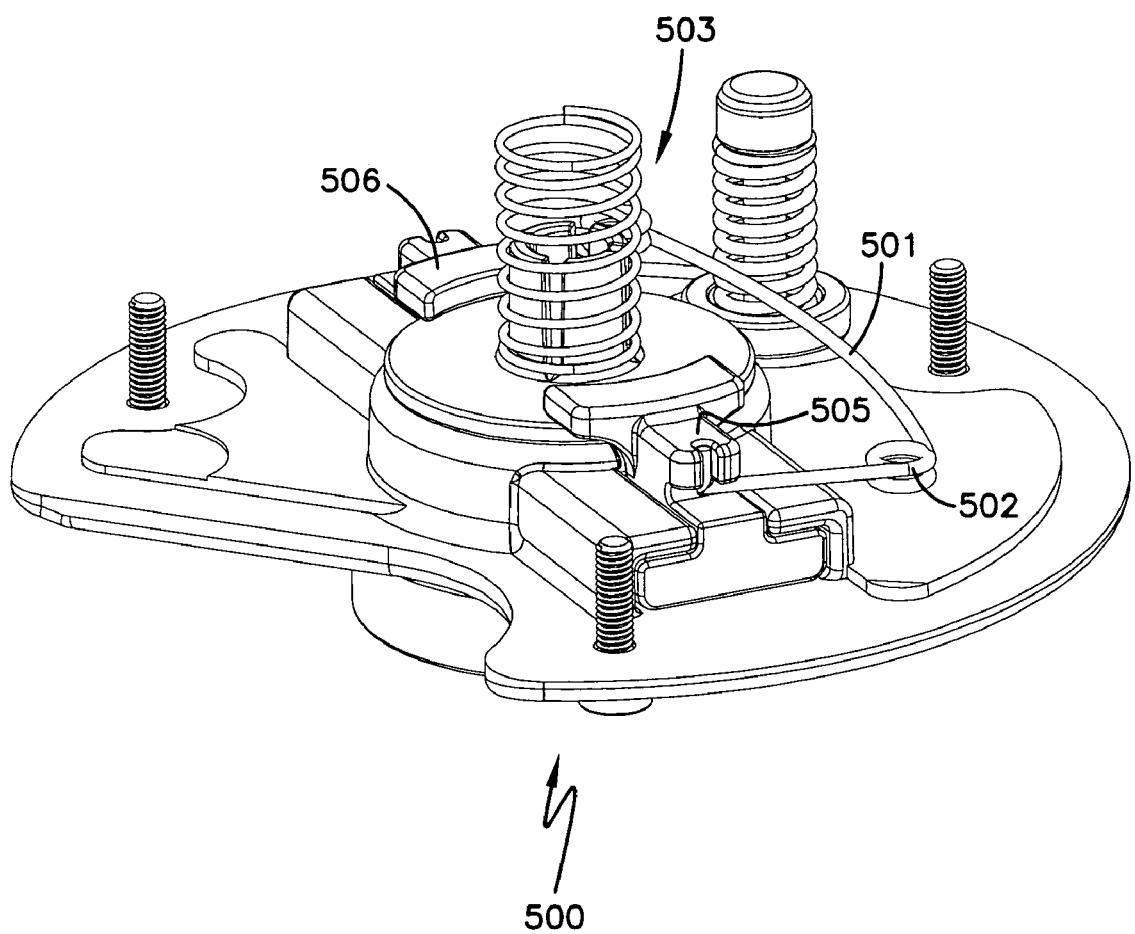
FIG. 22 is a top perspective view of alternate componentry useable in the assembly of FIGS. 2-19.
Figure 23:
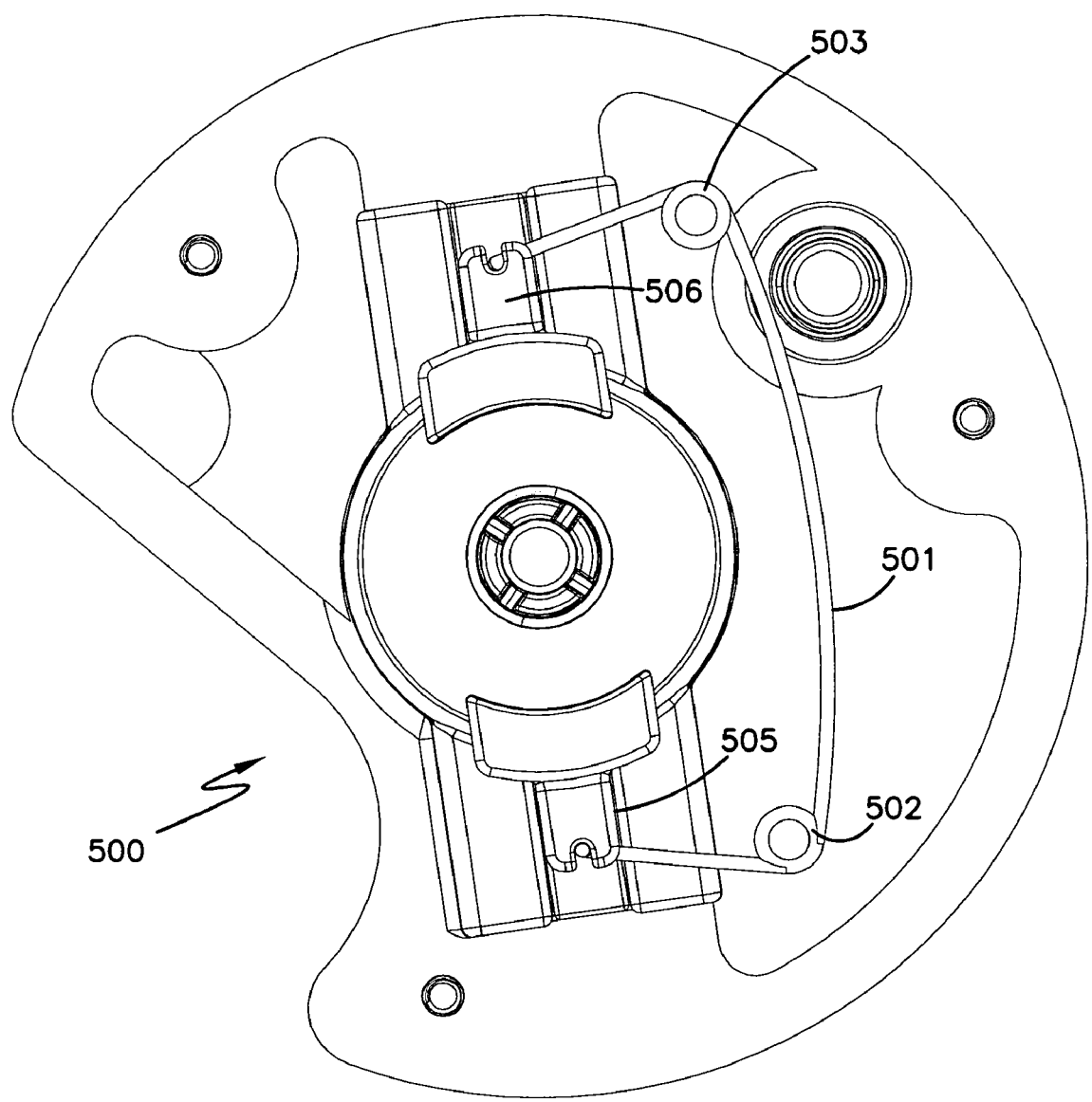
FIG. 23 is a top plan view of the componentry depicted in FIG. 22.
Figure 24:
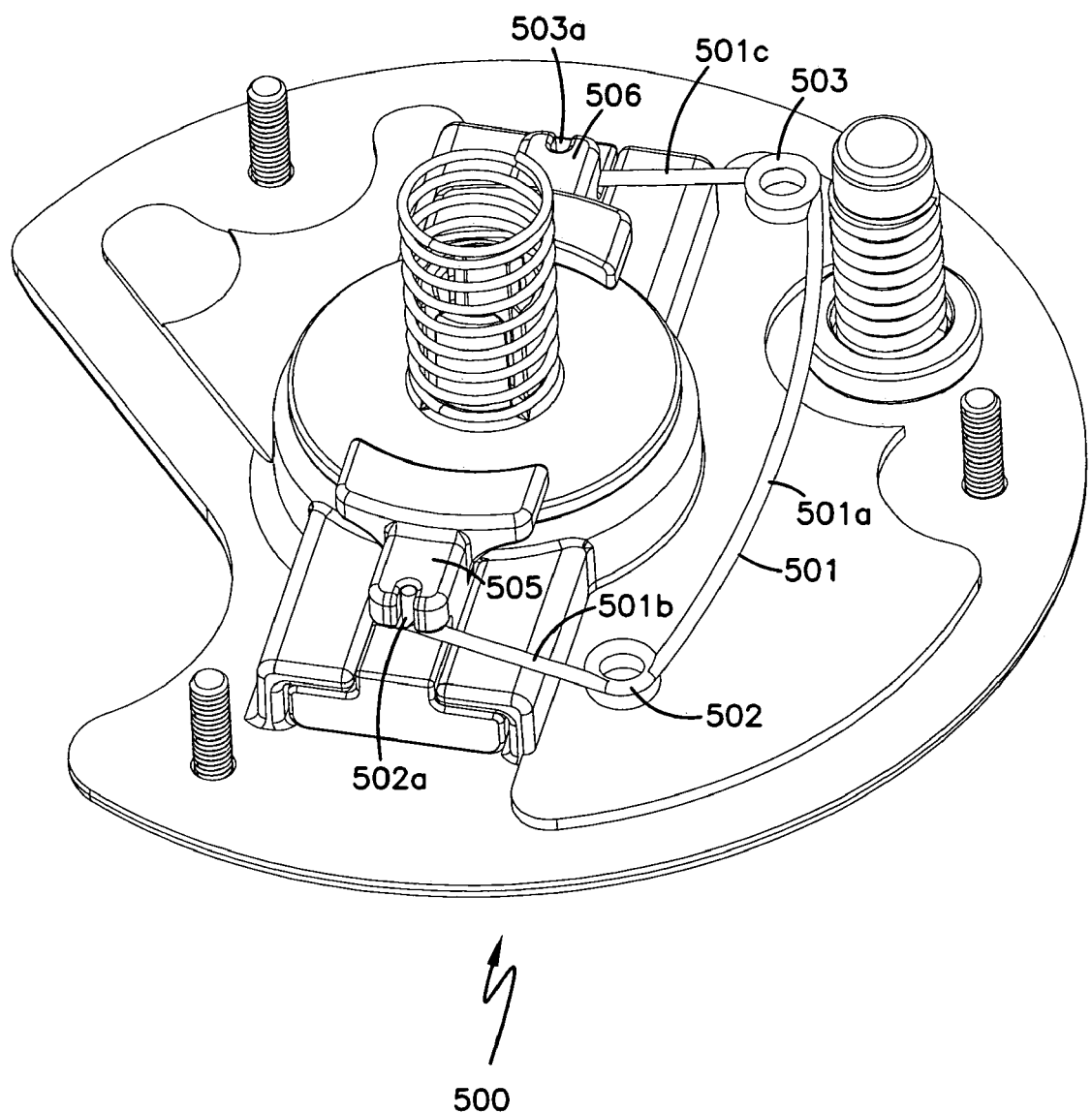
FIG. 24 is a perspective view of the componentry depicted in FIGS. 22 and 23, from a different perspective.

Attention is directed to FIGS. 22-24. These figures depict a plate assembly 500 analogous to assembly 241, FIG. 18. However, assembly 500 utilizes a different spring arrangement 501, from the spring arrangement 266, FIG. 18. In particular the spring arrangement 501 includes two spaced coiled sections 502, 503, one adjacent each of the lock members (slide members) or lockers 505, 506 respectively.

Spring arrangement 501, then, generally has a shape with three (uncoiled) segments attached to one another by coiled sections. This facilitates flexibility and operation. Preferably two coils 502, 503 are spaced apart from one another a distance generally corresponding to, or slightly longer than, a distance apart of locations 502a, 503a, whereat spring 501 engages the opposite lock members 505, 506 respectively. A general characterization of spring arrangement 501, FIGS. 22-24, then is that a long arcuate center section 501a is provided in extension between two coils, 502, 503. Also, spring arrangement 501 includes two end sections 501b and 501c oppositely positioned, in engagement with the coils 502, 503 respectively. As a result, the coils 502, 503 are provided adjacent a point of attachment between the spring arrangement 501 and the lockers 505, 506.

It is noted that in the arrangement of FIGS. 22-24, the lockers 505, 506 can be either cast metal or plastic pieces.

Referring to FIG. 21, when an adhesive is also used in addition to the bolts 241a, a trough or similar arrangement can be provided at region 430 to facilitate adhesive retention where desired.

Still referring to FIG. 21, it is noted that region 432, above o-ring 425, is unthreaded, and helps provide for a guiding of collar 426 and thus housing 203 in position, on filter head 202.

It is also noted that in FIG. 21 the cartridge 400 is depicted with a coiled metal inner liner 440, which would typically be made with interlocking edges and apertures, such as louvers, therein. Alternatively in some assemblies a plastic liner could be used, and in still other assemblies a liner in the cartridge could be avoided altogether.

Typically when plastic materials are utilized for the opposite end caps 202, 203 and the liner 440, molded nylon, for example glass reinforced nylon 66, can be used. However, alternative materials can be utilized.

By the use of such materials, a filter cartridge 400, FIG. 21, can be made which is completely metal free for ease of disposition. With such an arrangement, it will be preferred to utilize a plastic arrangement for the biasing arrangement 411a.

Referring to FIG. 21, in region 450, piston 451 extends around post 452, with motion controlled by spring 256. It is desirable to avoid trapping of liquid, such as oil, between parts 451, 452, to provide for good movement and control by spring 256. To facilitate this, a cut or aperture can be provided in one or both of piston 451 and post 452. Such a cut is shown for example at 455.

In general, it is not required that all of the specific features described herein, for example embodiments, being incorporated within an assembly, for the assembly to include advantages according to the present disclosure.

What is claimed is:

1. A filter assembly including:
(a) a filter head arrangement comprising:
  (i) a cover member; and,
  (ii) a plate arrangement secured in the cover member and defining: an unfiltered liquid flow channel; and, a central filtered liquid flow channel;
    (A) the central, filtered liquid flow channel including a flow exit aperture;
  (iii) an anti-drain back valve arrangement including a valve assembly having: a valve member; a biasing member; and, having a first, closed, orientation and a second, open, orientation;
    (A) the first closed orientation being an orientation in which the valve member is biased to close the exit aperture of the filtered liquid flow channel by the biasing member; and,
    (B) the second, open, orientation being an orientation which results from filtered liquid flow passage, in use, biasing the valve member away from the exit aperture of the filtered liquid flow channel;
(b) a filter bowl releasably mounted on the filter head; and
(c) a filter cartridge positioned within a filter bowl; the filter cartridge comprising:
  (i) a region of filter media defining a central, open, volume,
    (A) the region of filter media having first and second ends;
  (ii) a first end cap secured to the first end of the region of filter media;
  (iii) the filter cartridge including an axial stem thereon defining a central liquid flow conduit therethrough, in liquid flow communication with the central, open, volume defined by the filter media;
    (A) the axial stem including a portion projecting away from the filter media;
    (B) the axial stem including an outer, annular, seal arrangement thereon; and
    (C) an end of the axial stem remote from the filter media comprising an anti-drain back valve arrangement opening tip allowing the anti-drain back valve arrangement to be in the second, open, orientation; and,
  (iv) a second end cap secured to the second end of the region of filter media; and
(d) the anti-drain back valve arrangement being configured to bias to the first, closed, orientation when the bowl is removed from the valve head and the filter cartridge axial stem is separated from the anti-drain back valve arrangement.

2. A filter assembly according to claim 1, wherein:
(a) the anti-drain back valve arrangement further includes a lock arrangement comprising a moveable lock member arrangement having a first locked orientation and a second, unlocked, orientation:
  (i) the lock member arrangement in the first locked orientation, securing the valve member against movement from the closed orientation; and
  (ii) the lock member arrangement, in the second, unlocked, orientation releasing the valve member to allow movement from the closed orientation;
  (iii) the lock arrangement having a actuator arrangement configured for moving the lock arrangement into unlocked orientation when the filter cartridge is properly and operably positioned in the filter assembly; and,
  (iv) the actuator arrangement configured to move the lock member arrangement into the closed orientation when the filter cartridge axial stem is separated from the anti-drain back valve arrangement.

3. A filter assembly according to claim 2, wherein:
(a) the lock member arrangement comprises:
  (i) at least one slide member mounted on a slide track portion of the plate arrangement; and,
  (ii) a lock member biasing member positioned to bias the at least one slide member into the locked orientation; and
  (iii) the at least one slide member having a filter cartridge engagement portion thereon engaged, by the filter cartridge to bias the at least one slide member along the slide track portion, against the lock member biasing member, to maintain the lock member arrangement in the unlocked orientation.

4. A filter assembly according to claim 3, wherein:
(a) the lock member arrangement comprises two radially opposed, slide members each of which is biased by the same lock member biasing member.

5. A filter assembly according to claim 4, wherein:
(a) the central, filtered liquid, flow conduit of the plate arrangement includes:
  (i) an inner, cylindrical, seal surface for a filter cartridge; and,
  (ii) a pair of opposite slots, each being positioned for projection therethrough of the filter cartridge engagement portion of a slide member when the filter cartridge axial stem is separated from the anti-drain back valve arrangement.

6. A filter assembly according to claim 1, wherein:
(a) the axial stem includes a guide channel arrangement including at least one guide channel therein, positioned at a location between an O-ring seal member on the axial stem and the anti-drain back valve arrangement opening tip;
  (i) the at least one guide channel terminating at the anti-drain back valve arrangement opening tip.

7. A filter assembly according to claim 6, wherein:
(a) the axial stem defines a plurality of spaced axial projections each having an end that is not blunt and includes an apex.

8. A filter assembly according to claim 7, wherein:
(a) each apex not centrally positioned on each projection.

9. A filter assembly according to claim 7, wherein:
(a) each apex is defined by sides extending at an angle, around the apex, within the range of 110°-170°.

10. A filter assembly according to claim 6, wherein:
(a) the central filtered liquid flow channel includes at least one filter cartridge projection therein; and
(b) each guide channel is positioned in overlap with at least one filter cartridge alignment projection.

11. A filter cartridge for use as a serviceable filter cartridge with a liquid filter assembly having an anti-drain back valve arrangement; the filter cartridge comprising:

(a) a region of filter media defining a central, open, volume,
   (i) the region of filter media having first and second ends;
(b) a first end cap secured to the first end of the region of filter media;
(c) the filter cartridge including an axial stem thereon defining a central liquid flow conduit therethrough, in liquid flow communication with the central, open, volume defined by the filter media;
   (i) the axial stem including a portion projecting away from the filter media;
   (ii) the axial stem including an outer, annular, seal arrangement thereon comprising an o-ring seal member;
   (iii) an end of the axial stem remote from the filter media comprising an anti-drain back valve arrangement opening tip;
   (iv) the axial stem comprising a portion of the first end cap; and,
   (v) the axial stem including a guide channel arrangement including at least one guide channel therein, positioned at a location between the o-ring seal member and the anti-drain back valve arrangement opening tip; the at least one guide channel terminating at the anti-drain back valve arrangement opening tip; and,
(d) a second end cap secured to the second end of the region of filter media.

12. A filter cartridge according to claim 11 wherein:
(a) the guide channel arrangement includes at least three guide channels.

13. A filter cartridge according to claim 11 wherein:
(a) the region of filter media defines a cylindrical shape.

14. A filter cartridge according to claim 11 wherein:
(a) the axial stem defines a plurality of spaced axial projections each having an end that is not blunt and includes an apex.

15. A filter cartridge according to claim 14 wherein:
(a) each apex is not positioned in a center of an associated projection.

16. A filter cartridge according to claim 11 wherein:
(a) the axial stem defines a plurality of spaced axial projections each having an end with an apex defined by sides.

17. A filter cartridge according to claim 16 wherein:
(a) each apex is not positioned in a center of an associated axial projection end.

18. A filter cartridge according to claim 16 wherein:
(a) each apex is defined by sides extending at an angle, around the apex, within the range of 110°-170°.

19. A filter cartridge according to claim 18 wherein:
(a) each apex is defined by an angle within the range of 130°-150°.

20. A filter cartridge for use as a serviceable filter cartridge with a liquid filter assembly having an anti-drain back valve arrangement; the filter cartridge comprising:
(a) a region of filter media defining a central, open, volume,
   (i) the region of filter media having first and second ends;
(b) a first end cap secured to the first end of the region of filter media;
(c) the filter cartridge including an axial stem thereon defining a central liquid flow conduit therethrough, in liquid flow communication with the central, open, volume defined by the filter media;
   (i) the axial stem including a portion projecting away from the filter media;
   (ii) the axial stem including an outer, annular, seal arrangement thereon;
   (iii) an end of the axial stem remote from the filter media comprising an anti-drain back valve arrangement opening tip;
   (iv) the axial stem comprising a portion of the first end cap; and,
   (v) the axial stem including a guide channel arrangement including at least one guide channel therein, positioned at a location between the seal member and the an anti-drain back valve arrangement tip; the at least one guide channel terminating at the an anti-drain back valve arrangement tip; and,
(d) a second end cap secured to the second end of the region of filter media.

21. A filter head arrangement for a filter assembly; the head arrangement comprising:
(a) a cover member; and,
(b) a plate arrangement secured in the cover member and defining: an unfiltered liquid flow channel; and, a central, filtered, liquid flow channel;
   (i) the central, filtered, liquid flow channel including a flow exit aperture;
(c) an anti-drain back valve arrangement including a valve assembly having: a valve member; and, a biasing member; and, having a first, closed, orientation and a second, open, orientation;
   (i) the first closed orientation being an orientation in which the valve member is biased to close the exit aperture of the filtered liquid flow channel by the biasing member;
   (ii) the second, open, orientation being an orientation which results from filtered liquid flow passage, in use, biasing the valve member away from the exit aperture of the filtered liquid flow channel; and,
   (iii) the anti-drain back valve arrangement further including a lock arrangement comprising a moveable lock member arrangement having a first locked orientation and a second, unlocked, orientation:
      (A) the lock member arrangement in the first locked orientation, securing the valve member against movement from the closed orientation; and
      (B) the lock member arrangement, in the second, unlocked, orientation releasing the valve member to allow movement from the closed orientation; and,
      (C) the lock arrangement having an actuator arrangement configured for moving the lock arrangement from the locked orientation to the unlocked orientation upon engagement, within the filter head arrangement, of a filter cartridge properly and operably positioned in the filter assembly, in use.

22. A filter head arrangement according to claim 21 wherein:
(a) the lock member arrangement comprises:
   (i) at least one slide member mounted on a slide track portion of the plate arrangement; and,
   (ii) a lock member biasing member positioned to bias the at least one slide member into the locked orientation; and (iii) the at least one slide member having a filter cartridge engagement portion thereon configured to be engaged, in use, by a filter cartridge to bias the at least one slide member along the slide track portion, against the lock member biasing member, to move the lock member arrangement to the unlocked orientation.

23. A filter head arrangement according to claim 22 wherein:
   (a) the lock member arrangement comprises two radially opposed, slide members each of which is biased by the same lock member biasing member.

24. A filter head arrangement according to claim 23 wherein:
   (a) the central, filtered liquid, flow conduit of the plate arrangement includes:
      (i) an inner, cylindrical, seal surface for a filter cartridge; and,
      (ii) a pair of opposite slots, each being positioned for projection therethrough of the filter cartridge engagement portion of a slide member.

25. A filter head arrangement according to claim 24 wherein:
   (a) the lock member biasing member is a spring having three uncoiled sections separated by two coiled sections.

* * * * *

UNITED STATES PATENT AND TRADEMARK OFFICE
CERTIFICATE OF CORRECTION

PATENT NO. : 7,662,284 B2  Page 1 of 1
APPLICATION NO. : 11/630705
DATED : February 16, 2010
INVENTOR(S) : Greco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 207 days.

Signed and Sealed this

Thirtieth Day of November, 2010

David J. Kappos
*Director of the United States Patent and Trademark Office*